(12) United States Patent
Aizenberg et al.

(10) Patent No.: US 9,630,224 B2
(45) Date of Patent: Apr. 25, 2017

(54) SLIPPERY LIQUID-INFUSED POROUS SURFACES HAVING IMPROVED STABILITY

(71) Applicant: President and Fellows of Harvard College, Cambridge, MA (US)

(72) Inventors: Joanna Aizenberg, Boston, MA (US); Nicolas Vogel, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/414,684

(22) PCT Filed: Jul. 12, 2013

(86) PCT No.: PCT/US2013/050343
§ 371 (c)(1),
(2) Date: Jan. 13, 2015

(87) PCT Pub. No.: WO2014/012039
PCT Pub. Date: Jan. 16, 2014

(65) Prior Publication Data
US 2015/0196940 A1 Jul. 16, 2015

Related U.S. Application Data

(60) Provisional application No. 61/673,705, filed on Jul. 19, 2012, provisional application No. 61/671,442, (Continued)

(51) Int. Cl.
*B08B 17/06* (2006.01)
*B05D 5/08* (2006.01)
*C09D 5/16* (2006.01)

(52) U.S. Cl.
CPC .............. *B08B 17/065* (2013.01); *B05D 5/08* (2013.01); *C09D 5/1681* (2013.01); *Y10T 428/24355* (2015.01)

(58) Field of Classification Search
CPC ...... B08B 17/065; C09D 5/1681; B05D 5/08; Y10T 428/24355
See application file for complete search history.

(56) References Cited

U.S. PATENT DOCUMENTS 3,274,007 A 9/1966 Jones
4,633,004 A 12/1986 Boutevin et al.
(Continued)

FOREIGN PATENT DOCUMENTS

CN 1360618 7/2002
CN 1884398 12/2006
(Continued)

OTHER PUBLICATIONS

Abbott, et al., "Mass Production of Bio-Inspired Structured Surfaces", Proceedings of the Institution of Mechanical Engineers, Part C: Journal of Mechanical Engineering Science, 221(10):1181-1191, Oct. 1, 2007, 11 pages.
(Continued)

*Primary Examiner* — Laura Auer
(74) *Attorney, Agent, or Firm* — Wilmer Cutler Pickering Hale and Dorr LLP

(57) ABSTRACT

Methods and articles disclosed herein relate to liquid repellant surfaces having selective wetting and transport properties. An article having a repellant surface includes a substrate comprising surface features with re-entrant curvature and an immobilized layer of lubricating liquid wetting over the surface features. The surface features with re-entrant curvature can be designed to provide high repellency even after failure or removal of the immobilized layer of lubricating liquid under certain operating conditions.

26 Claims, 40 Drawing Sheets

Related U.S. Application Data filed on Jul. 13, 2012, provisional application No. 61/746,296, filed on Dec. 27, 2012.

(56) References Cited

U.S. PATENT DOCUMENTS

| | | | |
|---|---|---|---|
| 5,358,719 | A | 10/1994 | Mellul et al. |
| 5,620,778 | A | 4/1997 | Clatworthy |
| 5,624,713 | A | 4/1997 | Ramer |
| 5,630,846 | A | 5/1997 | Hara et al. |
| 5,798,409 | A | 8/1998 | Ho |
| 5,804,318 | A | 9/1998 | Pinchuk et al. |
| 6,071,981 | A | 6/2000 | Johnson et al. |
| 6,232,379 | B1 | 5/2001 | Takita |
| 6,511,753 | B1 | 1/2003 | Teranishi et al. |
| 7,189,934 | B2 | 3/2007 | Youngner |
| 7,192,993 | B1 | 3/2007 | Sarangapani et al. |
| 7,560,492 | B1 | 7/2009 | Claude et al. |
| 7,666,514 | B2 | 2/2010 | Sakamoto et al. |
| 7,723,405 | B2 | 5/2010 | Braun et al. |
| 7,811,666 | B2 | 10/2010 | Dry |
| 2001/0014711 | A1 | 8/2001 | Levy |
| 2003/0212232 | A1 | 11/2003 | Majeti et al. |
| 2004/0034941 | A1 | 2/2004 | Iwato et al. |
| 2004/0186211 | A1 | 9/2004 | Howell et al. |
| 2005/0164008 | A1 | 7/2005 | Rukavina |
| 2006/0024504 | A1 | 2/2006 | Nelson et al. |
| 2006/0153993 | A1 | 7/2006 | Schmidt et al. |
| 2006/0159645 | A1 | 7/2006 | Miller et al. |
| 2007/0039832 | A1 | 2/2007 | Heikenfeld |
| 2007/0141306 | A1* | 6/2007 | Kasai ............... B05D 5/08 428/143 |
| 2007/0166344 | A1 | 7/2007 | Qu et al. |
| 2007/0184733 | A1 | 8/2007 | Manley |
| 2007/0254000 | A1 | 11/2007 | Guo et al. |
| 2009/0078153 | A1 | 3/2009 | Shchukin et al. |
| 2009/0098299 | A1 | 4/2009 | Cheng |
| 2009/0209922 | A1 | 8/2009 | Boisjoly |
| 2010/0009583 | A1 | 1/2010 | Bringley et al. |
| 2010/0210745 | A1 | 8/2010 | McDaniel et al. |
| 2011/0165206 | A1 | 7/2011 | Liu et al. |
| 2011/0283778 | A1 | 11/2011 | Angelescu et al. |
| 2011/0287987 | A1 | 11/2011 | Mordukhovich et al. |
| 2012/0141052 | A1 | 6/2012 | Drew et al. |

FOREIGN PATENT DOCUMENTS

| | | |
|---|---|---|
| CN | 101052667 A | 10/2007 |
| CN | 101198542 A | 6/2008 |
| CN | 101374607 A | 2/2009 |
| CN | 101444777 A | 6/2009 |
| CN | 101538395 A | 9/2009 |
| CN | 101580753 A | 11/2009 |
| CN | 101675156 A | 3/2010 |
| CN | 101918621 A | 12/2010 |
| CN | 102388180 A | 3/2012 |
| DE | 19818956 A1 | 11/1998 |
| EP | 0166998 A2 | 1/1986 |
| EP | 0338418 A1 | 10/1989 |
| EP | 0497204 A2 | 8/1992 |
| EP | 0893164 A2 | 1/1999 |
| EP | 1002825 A2 | 5/2000 |
| EP | 1487590 B1 | 12/2004 |
| EP | 2228053 A1 | 9/2010 |
| EP | 2363438 A1 | 9/2011 |
| JP | S60-259269 A | 12/1985 |
| JP | 62-063219 A | 3/1987 |
| JP | 01-170932 A | 7/1989 |
| JP | 04-270649 A | 9/1992 |
| JP | 05-229402 A | 9/1993 |
| JP | 5240251 B2 | 9/1993 |
| JP | 07-242769 A | 9/1995 |
| JP | 2000-510353 A | 8/2000 |
| JP | 2003-170540 A | 6/2003 |
| JP | 2004-037764 A | 2/2004 |
| JP | 2005-082848 A | 3/2005 |
| JP | 2005-231084 A | 9/2005 |
| JP | 2009-523890 A | 6/2009 |
| JP | 2010-047890 A | 3/2010 |
| WO | WO-92/10532 A1 | 6/1992 |
| WO | WO-93/17077 A1 | 9/1993 |
| WO | WO-99/36490 A1 | 7/1999 |
| WO | WO-01/78800 A1 | 10/2001 |
| WO | WO-02/09647 A2 | 2/2002 |
| WO | WO-03013827 A1 | 2/2003 |
| WO | WO-2005091309 | 9/2005 |
| WO | WO-2005/121288 A1 | 12/2005 |
| WO | WO-2006/091235 A1 | 8/2006 |
| WO | WO-2006/118460 A1 | 11/2006 |
| WO | WO-2007/130734 A2 | 11/2007 |
| WO | WO-2008/013825 A2 | 1/2008 |
| WO | WO 2010028752 A1 * | 3/2010 ............. B01D 69/02 |
| WO | WO-2010028752 A1 | 3/2010 |
| WO | WO-2010/042804 A2 | 4/2010 |
| WO | WO-2010/065960 A2 | 6/2010 |
| WO | WO-2010116045 | 10/2010 |
| WO | WO-2011005200 A1 | 1/2011 |
| WO | WO-2011/049896 A2 | 4/2011 |
| WO | WO-2012/055821 A1 | 5/2012 |
| WO | WO-2012/100099 A2 | 7/2012 |
| WO | WO-2012/100100 A2 | 7/2012 |
| WO | WO-2013/022467 A2 | 2/2013 |
| WO | WO-2013/106588 A1 | 7/2013 |
| WO | WO-2013/115868 A2 | 8/2013 |

OTHER PUBLICATIONS

Afessa, B. et al., "Association Between a Silver-Coated Endotracheal Tube and Reduced Mortality in Patients With Ventilator-Associated Pneumonia," Chest, vol. 137, pp. 1015-1021 (May 2010).

Ahuja, A. et al., "Nanonails: A Simple Geometrical Approach to Electrically Tunable Superlyophobic Surfaces," Langmuir, vol. 24, pp. 9-14 (2008).

Badrossamay, Mohammad Reza, et al., "Nanofiber Assembly by Rotary Jet-Spinning," Nano Letters, vol. 10, No. 6, pp. 2257-2261, 11 pages (Jun. 9, 2010).

Bai, Joseph R. et al., "Core-Annular Flows," Annual Review Fluid Mechanics, vol. 29, pp. 65-90 (Jan. 1997).

Banerjee, I. et al., "Antifouling coatings: recent developments in the design of surfaces that prevent fouling by proteins, bacteria, and marine organisms," Advanced Materials, pp. 690-718 (2011).

Banerjee, S. et al., "Infection control during GI endoscopy," Gastrointest. Endosc., vol. 67, pp. 781-790 (May 2008).

Banhart, John, "Manufacture, characterisation and application of cellular metals and metal foams," Progress in Materials Science, vol. 46, pp. 559-632 (2001).

Barstad, R. M. et al., "Monocyte procoagulant activity induced by adherence to an artificial surface is reduced by end-point immobilized heparin-coating of the surface", Thrombosis and Haemostasis, vol. 79, pp. 302-305, Downloaded from www.thrombosis-online.com com on (Mar. 17, 2014).

Barthlott, W. & Neinhuis, C., "Purity of the sacred lotus, or escape from contamination in biological surfaces," Planta, vol. 202, pp. 1-8 (Apr. 1997).

Bauer, et al., "The Insect-Trapping Rim of Nepenthes Pitchers", Plant Signaling & Behavior, 4(11):1019-1023, Nov. 1, 2009.

Beilenhoff, U. et al., "ESGE-ESGENA guideline: Cleaning and disinfection in gastrointestinal endoscopy Update 2008," Endoscopy, vol. 40, pp. 939-957 (Sep. 23, 2008).

Berger, R. G., "Flavours and Fragrances: Chemistry, Bioprocessing and Sustainability," Springer, 15 pages—Title page, Copyright Page and Table of Contents Only (2007).

Bhardwaj, U. et al., "A review of the development of a vehicle for localized and controlled drug delivery for implantable biosensors," J. Diabetes Sci. Technol., vol. 2, pp. 1016-1029 (Nov. 2008).

Bico, J. et al., "Rough wetting," Europhysics Letters, vol. 55, No. 2, pp. 214-220 (Jul. 15, 2001).

(56) References Cited

OTHER PUBLICATIONS

Bico, J. et al., "Wetting of textured surfaces," Colloids and Surfaces, A: Physicochemical and Engineering Aspects, vol. 206, pp. 41-46 (No Month Listed 2002).
Bocquet, L. & Lauga, E., "A smooth future?," Nature Mater., vol. 10, pp. 334-337 (May 2011).
Bohn, et al., "Insect Aquaplaning: Nepenthes Pitcher Plants Capture Prey with the Peristome, a Fully Wettable Water-Lubricated Anisotropic Surface", PNAS, 101(39):14138-14143, Sep. 28, 2004, 6 pages.
Bos, R. et al., "Retention of bacteria on a substratum surface with micro-patterned hydrophobicity," FEMS Microbiology Letters, vol. 189, No. 2, pp. 311-315 (Aug. 15, 2000).
Cassie, A.B.D. & Baxter, S., "Large contact angles of plant and animal surfaces," Nature, vol. 155, pp. 21-22 (Jan. 6, 1945).
Cassie, et al., "Wettability of Porous Surfaces", Transactions of the Faraday Society, vol. 40, pp. 546-551, Jan. 1944, 6 pages.
Chaudhury, Manoj K. and Whitesides, George M., "Direct Measurement of Interfacial Interactions between Semispherical Lenses and Flat Sheets of Poly(dimethylsiloxane) and Their Chemical Derivatives," Langmuir, vol. 7, pp. 1013-1025 (1991).
Chen, S. et al., "Surface hydration: Principles and applications toward low-fouling/nonfouling biomaterials," Polymer, vol. 51, pp. 5283-5293 (Aug. 10, 2010).
Chinese Office Action issued by the State Intellectual Property Office of the People's Republic of China for Application No. 201280012205.0 dated May 13, 2015 (20 pages).
Chinese Office Action issued by the State Intellectual Property Office of the People's Republic of China for Application No. 201280012210.1 dated May 21, 2015 (30 pages).
Clark, Jr., Leland C. and Gollan, Frank, "Survival of Mammals Breathing Organic Liquid Equilibriated With Oxygen at Atmospheric Pressure", Science, vol. 152, pp. 1755-1756 (Jun. 24, 1966).
Costerton, J. et al., "Bacterial biofilms: a common cause of persistent infections," Science, vol. 284, No. 5418, pp. 1318-1322 (May 21, 1999).
Costerton, J.W. et al., "Bacterial biofilms in nature and disease," Ann. Rev. Microbiol., vol. 41, pp. 435-464 (1987).
Cribier, A. et al., "Percutaneous transcatheter implantation of an aortic valve prosthesis for calcific aortic stenosis—First human case description," Circulation, vol. 106, pp. 3006-3008 (Nov. 25, 2002).
Crnich, C.J. & G. Maki, D.G., "The Promise of Novel Technology for the Prevention of Intravascular Device-Related Bloodstream Infection. I. Pathogenesis and Short-Term Devices," Clinical Infectious Diseases, vol. 34, pp. 1232-1242 (May 1, 2002).
Database WPI Weekly 198933, Thomson Scientific, London, GB, AN 1989-237086, XP002694116 & JP1170932A (Nippon Sheet Glass Co. Ltd.) 1 page (Jul. 6, 1989) (abstract).
De Beer, D. & Stoodley, P., "Microbial Biofilms," Prokaryotes, vol. 1, pp. 904-937 (2006).
de Gennes, P.G. et al., "Capillarity and Wetting Phenomena: drops, bubbles, pearls, waves," Springer, New York, 151 pages (2004).
Dieter, R.S., "Coronary artery stent infection," Clin. Cardiol., vol. 23, pp. 808-810 (Jan. 6, 2000).
Dismukes et al., "Prosthetic valve endocarditis. Analysis of 38 cases," Circulation, vol. 48, pp. 365-377 (Aug. 1973).
Drelich, et al., "Measurement of Interfacial Tension in Fluid-Fluid Systems", Encyclopedia of Surface and Colloid Science, pp. 3152-3166 (Jan. 2002).
Fadeev, A. Y. and McCarthy, T. J., "Surface Modification of Poly(ethylene terephthalate) to Prepare Surfaces with Silica-Like Reactivity," Langmuir, vol. 14, No. 19, pp. 5586-5593 (1998).
Fowkes, F.M. , "Attractive forces at interfaces," Ind. Eng. Chem., vol. 56, pp. 40-52 (Dec. 1964).
Fuerstman, et al., "Coding/Decoding and Reversibility of droplet trains in Microfluidic networks," Science, vol. 315, No. 5813, pp. 828-832 (Feb. 9, 2007).

Gao, L. and McCarthy, T.J., "Teflon is Hydrophilic. Comments on Definitions of Hydrophobic, Shear versus Tensile Hydrophobicity, and Wettability Characterization," Langmuir, vol. 24, pp. 9183-9188 (Sep. 2, 2008).
Garg, N. et al., "Acute Coronary Syndrome Caused by Coronary Artery Mycotic Aneurysm Due to Late Stent Infection Localized With Radiolabeled Autologous Leukocyte Imaging," Clin. Nucl. Med., vol. 34, pp. 753-755 (Nov. 2009).
George, P.A. et al., "Self-assembling polystyrene-block poly(ethylene oxide) copolymer surface coatings: resistance to protein and cell adhesion," Biomaterials, vol. 30 pp. 2449-2456 (May 2009).
Gristina, A.G. Et al., "Biomaterial-centered sepsis and the total artifical heart. Microbial adhesion vs tissue integration," JAMA, vol. 259, pp. 870-874 (Feb. 1988).
Hall-Stoodley, L. et al., "Bacterial biofilms: from the natural environment to infectious diseases," Nature Reviews Microbiology, vol. 2, No. 2, pp. 95-108 (Feb. 2004).
Hatton, et al., "Assembly of large-area, highly ordered, crack-free inverse opal films," Proceedings of the National Academy of Science of the United States of America, vol. 107, No. 23, pp. 10354-10359 (Jun. 8, 2010).
Hearn, A.T. et al., "Endovascular stent infection with delayed bacterial challenge," American Journal of Surgery, vol. 174, pp. 157-159 (Aug. 1997).
Hejazi, et al., "Wetting Transitions in Two-, Three-, and Four-Phase Systems", Langmuir, vol. 28, pp. 2173-2180, (2012).
Inazaki, S. et al., "Surface modification of polytetrafluoroethylene with ArF excimer laser irradiation," J. Photopoly. Sci. Technol. vol. 7, No. 2, pp. 389-395 (1994).
International Search Report and Written Opinion issued by the European Patent Office as International Searching Authority for International Application No. PCT/US2013/050403 dated Dec. 4, 2013 (21 pages).
International Search Report and Written Opinion issued by the International Searching Authority for International Application No. PCT/US14/25935 mailed on Jan. 23, 2015 (11 pages).
International Search Report and Written Opinion issued by the International Searching Authority for International Application No. PCT/US2013/050406 mailed on Nov. 20, 2013 (20 pages).
International Search Report and Written Opinion Issued by the U.S. Patent and Trademark Office as International Searching Authority for International Application No. PCT/US09/48880 mailed Nov. 17, 2009 (14 pages).
International Search Report and Written Opinion Issued by the U.S. Patent and Trademark Office as International Searching Authority for International Application No. PCT/US11/44553 mailed Oct. 31, 2011 (12 pages).
International Search Report and Written Opinion issued by the European Patent Office as International Searching Authority for International Application No. PCT/US2012/021929, mailed Aug. 21, 2012 (23 pages).
International Search Report and Written Opinion issued by the European Patent Office as International Searching Authority for International Application No. PCT/US2013/021056 mailed Jun. 6, 2013 (21 pages).
International Search Report issued by the European Patent Office as International Searching Authority for International Application No. PCT/US2012/021928, mailed Aug. 10, 2012, 6 pages.
Ishino, et al., "Wicking Within Forests of Micropillars", EPL Journal, vol. 79, pp. 56005-p1-56005-p5, Sep. 2007, 5 pages.
Israelachvili, Jacob N., "Intermolecular and Surface Forces—Third Edition," Academic Press, 706 pages (2011).
Karchmer, A.W. et al., "Staphylococcus epidermidis causing prosthetic valve endocarditis: microbiologic and clinical observations as guides to therapy," Ann. Intern. Med., vol. 98, pp. 447-455, (Apr. 1, 1983).
Khoo, X. et al., "Directed assembly of PEGylated-peptide coatings for infection-resistant titanium metal," J. Am. Chem. Soc., vol. 131, pp. 10992-10997 (No month listed 2009).
Kim, et al., "Structural Transformation by Electrodeposition on Patterned Substrates (STEPS): A new Versatile Nanofabrication Method," Nano Letters, vol. 12, No. 2, pp. A-G (Mar. 2011).

(56) References Cited

OTHER PUBLICATIONS

Kobayashi, H. and Owen, M.J., "Surface tension of poly[(3,3,4,4,5,5,6,6-nonafluorohexyl)-methylsiloxane]," Macromolecules, vol. 23, No. 23, pp. 4929-4933 (1990).

Koschwanez, H.E. et al., "In vitro and in vivo characterization of porous poly-L-lactic acid coatings for subcutaneously implanted glucose sensors," Journal of Biomedical Materials Research Part A, pp. 792-807 (Dec. 2008).

Lee, Woo, et al., "Fast fabrication of long-range ordered porous alumina membranes by hard anodization," Nature Mater., vol. 5, pp. 741-747 (Sep. 2006).

Li, Yang, et al., "Bioinspired Self-Healing Superhydrophobic Coatings," Angewandte Chemie, vol. 49, No. 35, pp. 6129-6133 (Aug. 16, 2010).

Lillehoj, et al., "A self-pumping lab-on-a-chip for rapid detection of botulinum toxin," Lab Chip, vol. 10, pp. 2265-2270 (Jun. 11, 2010).

Lin, T-K, et al., "Surface modification of polytetrafluoroethylene films by plasma pretreatment and graft copolymerization to improve their adhesion to bismaleimide," Polym. Int., vol. 58, No. 1, pp. 46-53 (Jan. 2009).

Matsunaga, Mariko, et al., "Controlling the Stability and Reversibility of Micropillar Assembly by Surface Chemistry," J. Am. Chem. Soc., vol. 133, No. 14, pp. 5545-5553, 4 pages (Dec. 2, 2011).

Meuler, Adam J. et al., "Relationships between Water Wettability and Ice Adhesion," ACS Applied Materials and Interfaces, vol. 2, No. 11, 31 pages (Oct. 15, 2010).

MicroSurfaces, Inc., "Anti-Stiction Coatings in MEMS Devices," MicroSurfaces, Inc., retreived from website URL: http://memsurface.com/stiction.html, 2 pages (retrieved on Dec. 8, 2011).

Munro, W.A. et al., "Deterioration of pH electrode response due to biofilm formation on the glass membrane," Sensors and Actuators B-Chem, vol. 37, pp. 187-194 (Dec. 1996).

Nguyen, et al., "Quantitative Testing of Robustness on Superomniphobic Surfaces by Drop Impact", Langmuir, 26(23):18369-18373, Dec. 7, 2010, 5 pages.

Niimi, Y. et al., "The effects of heparin coating of oxygenator fibers on platelet adhesion and protein adsorption," Anesth. Analg., vol. 89, pp. 573-579 (May 12, 1999).

Noetzel, M.J. & Baker, R.P., "Shunt fluid examination: risks and benefits in the evaluation of shunt malfunction and infection," J. Neurosurg., vol. 61, pp. 328-332 (Aug. 1984).

Nosonovsky, "Multiscale Roughness and Stability of Superhydrophobic Biomimetic Interfaces", Langmuir, 23(6):3157-3161, Feb. 13, 2007, 5 pages.

Nosonovsky, et al., "Biomimetic Superhydrophobic Surfaces: Multiscale Approach", Nano Letters, vol. 7, No. 9, pp. 2633-2637, Aug. 17, 2007.

O'Toole, G., et al., "Biofilm Formation as Microbial Development," Annu. Rev. Microbiol., vol. 54, pp. 49-79, 35 pages (2000).

Park, K.D. et al., "Bacterial adhesion on PEG modified polyurethane surfaces," Biomaterials, vol. 19, No. 7-9, pp. 851-859 (Apr.-May 1998).

Poetes, et al., "Metastable Underwater Superhydrophobicity," Physical Review Letters, vol. 105, Issue 16, pp. 166104.1-166104.4 Published (Oct. 14, 2010).

Pokroy, B. et al., "Fabrication of Biolnspired Actuated Nanostructures with Arbitrary Geometry and Stiffness," Adv. Mater., vol. 21, pp. 463-469 (Jan. 26, 2009).

Prakash and Gershenfeld, "Microfluidic Bubble Logic," Science, vol. 315, No. 5813, 176 pages (Sep. 2008).

Prakash and Gershenfeld, "Microfluidic Bubble Logic," Science, vol. 315, No. 5813, 5 pages (Feb. 9, 2007).

Prime, K.L. & Whitesides, G.M., "Self-assembled organic monolayers: model systems for studying adsorption of proteins at surfaces," Science, vol. 252, No. 5009, p. 1164-1167 (May 24, 1991).

Quere, D., "Wetting and roughness," Annu. Rev. Mater. Res., vol. 38, pp. 71-99 (Apr. 7, 2008).

Raza, et al., "Superhydrophobic Surfaces by Anomalous Fluoroalkylsilane Self-Assembly on Silica Nanosphere Arrays", Langmuir, 26(15):12962-12972, Aug. 3, 2010, 11 pages.

Rothemund, Paul W.K., "Folding DNA to create nanoscale shapes and patterns," Nature, vol. 440, 82 pages (Mar. 16, 2006).

Rothemund, Paul W.K., "Folding DNA to create nanoscale shapes and patterns," Nature, vol. 440, pp. 297-302, Mar. 16, 2006.

Rowe, David J., "Chemistry and Technology of Flavors and Fragrances," Blackwell Publishing Ltd, 12 pages—Title Page, Copyright Page and Table of Contents Only (2005).

Shaffer, T.H. et al., "Liquid Ventilation," Pediatric Pulmonology, vol. 14, pp. 102-109 (Oct. 1992).

Shafrin, E.G. & Zisman, W.A., "Constitutive relations in the wetting of low energy surfaces and the theory of the retraction method of preparing monolayers," J. Phys. Chem., vol. 64, pp. 519-524 (May 1960).

Skattum, L. et al., "Complement deficiency states and associated infections," Mol. Immunol., vol. 48, No. 14, pp. 1643-1655 (Aug. 2011).

Sohail, M.R. et al., "Risk factor analysis of permanent pacemaker infection," Clin. Infect. Dis., vol. 45, pp. 166-173 (Jul. 15, 2007).

Stober, W. and Fink, A., "Controlled growth of monodisperse silica spheres in the micron size range," Journal of Colloid and Interface Science, vol. 26, No. 1, pp. 62-69 (Jan. 1968).

Trevors, J.T., "Silver resistance and accumulation in bacteria," Enzyme and Microbial Technology, vol. 9, No. 6, pp. 331-333 (Jun. 1987).

Tuli, S. et al., "Risk factors for repeated cerebrospinal shunt failures in pediatric patients with hydrocephalus," J. Neurosurg., vol. 92, pp. 31-38 (Jan. 2000).

Tuteja, Anish, et al., "Designing Superoleophobic Surfaces," Science, vol. 318, No. 5856, pp. 1618-1622 (Dec. 7, 2007) www.sciencemag.org.

Tuteja, Anish, et al., "Robust omniphobic surfaces," PNAS, vol. 105, No. 47, pp. 18200-8205 (Nov. 25, 2008).

Varanasi, Kripa K. et al., "Frost formation and ice adhesion on superhydrophobic surfaces," Applied Physics Letters, vol. 97, pp. 234102-1-234102-3 (2010).

Vogel et al., "A Convenient Method to Produce Close- and Non-close-Packed Monolayers using Direct Assembly at the Air-Water Interface and Subsequent Plasma-Induced Size Reduction," Macromolecular Chemistry and Physics, vol. 212, pp. 1719-1734 (2011).

Vogel et al., "From soft to hard: the generation of functional and complex colloidal monolayers for nanolithography," Soft Matter, vol. 8, pp. 4044-4061 (2012).

Vogel, et al., "Wafer-Scale Fabrication of Ordered Binary Colloidal Monolayers with Adjustable Stoichiometries," Advanced Functional Materials, vol. 21, pp. 3064-3073 (2011).

Voskerician, G. et al., "Biocompatibility and biofouling of MEMS drug delivery devices," Biomaterials, vol. 24, pp. 1959-1967 (2003).

Wasserscheid, P. and Welton, T., "Ionic Liquids in Synthesis," Wiley-VCH Verlag GmbH & Co., 380 pages (2002).

Wenzel, "Resistance of Solid Surfaces to Wetting by Water", Industrial and Engineering Chemistry, 28(8):988-994, Aug. 1936, 7 pages.

Williams, Kirt R., et al., "Etch Rates for Micromachining Processing-Part II," Journal of Microelectromechanical Systems, vol. 12, No. 6, pp. 761-778 (Dec. 2003).

Wilson, G.S. & Gifford, R., "Biosensors for real-time in vivo measurements," Biosens. Bioelectron., vol. 20, pp. 2388-2403 (Jan. 15, 2005).

Wong, P.K. et al., "Deformation of DNA Molecules by Hydrodynamic Focusing," Journal of Fluid Mechanics, vol. 497, pp. 55-65 (2003).

Wong, Pak Kin, et al., "Closed-loop control of cellular functions using combinatory drugs guided by a stochastic search algorithm," Proceedings of National Academy of Science for the United States of America, vol. 105, No. 13, pp. 5105-5110 (Apr. 1, 2008).

Wong, T. S. et al., "Bioinspired self-repairing slippery surfaces with pressure-stable omniphobicity," Nature, vol. 477, No. 7365, pp. 443-447 (Sep. 22, 2011).

(56) References Cited

OTHER PUBLICATIONS

Wool, "Self-Healing Materials: A Review", Soft Matter, 4:400-418, Advance Article published online, Jan. 10, 2008, 19 pages.
Xu, Q. et al., "Approaching Zero: Using Fractured Crystals in Metrology for Replica Molding," J. Am. Chem. Soc., vol. 127, No. 3, pp. 854-855 (2005).
Zhao, L. et al., "Antibacterial coatings on titanium implants," Journal of Biomedical Materials Research Part B: Applied Biomaterials, vol. 91, No. 1, pp. 470-480 (2009).
Keck et al., "Preparation of partially fluorinated aryl/alkyl vinylene ether polymers," Polymer International, vol. 62, Issue 10, pp. 1485-1491, Oct. 2013.
Miller-Chou et al., "A review of polymer dissolution," Progress in Polymer Science, vol. 28, pp. 1223-1270, (2003).
Liu et al., "Organogel-based Thin Films for Self-Cleaning on Various Surfaces," Advanced Materials, 5 pages, (2013).
Zhu et al., "Ice-phobic coatings based on Silicon-Oil-Infused Polydimethylsiloxane," American Chemical Society Applied Materials & Interfaces, vol. 5, pp. 4053-4062, (2013).

* cited by examiner

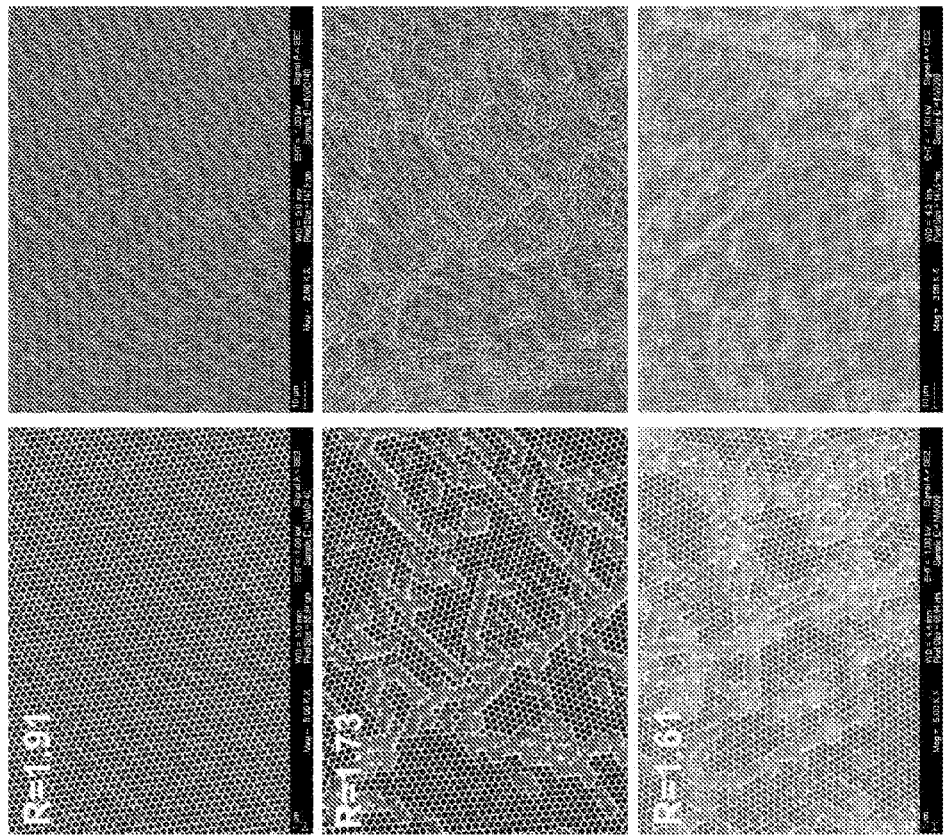

SLIPPERY LIQUID-INFUSED POROUS SURFACES HAVING IMPROVED STABILITY

CROSS-REFERENCE TO RELATED APPLICATIONS

This application is a U.S. National Phase application under 35 U.S.C. 371 of International Patent Application No. PCT/US2013/050343, filed Jul. 12, 2013, which claims the benefit of the earlier filing date of U.S. Patent Application No. 61/671,442, filed Jul. 13, 2012; and U.S. Patent Application No. 61/673,705, filed on Jul. 19, 2012; and U.S. Patent Application No. 61/746,296, filed on Dec. 27, 2012, the contents of which are incorporated by reference herein in their entireties.

The present application related to the following co-pending applications filed on even date herewith:

International Application entitled SELECTIVE WETTING AND TRANSPORT SURFACES, filed on even date herewith;

International Application entitled MULTIFUNCTIONAL REPELLENT MATERIALS, filed on even date herewith; and International Application entitled STRUCTURED FLEXIBLE SUPPORTS AND FILMS FOR LIQUID-INFUSED OMNIPHOBIC SURFACES, filed on even date herewith; the contents of which are incorporated by reference herein in their entireties.

STATEMENT REGARDING FEDERALLY SPONSORED RESEARCH OR DEVELOPMENT

This invention was made with government support under Award Number DE-AR0000326 awarded by Advanced Research Projects Agency-Energy (ARPA-E), U.S. Department of Energy and under Award Number FA9550-09-1-0669-DOD35CAP awarded by the U.S. Air Force. The government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

The field of this application generally relates to slippery surfaces, methods for forming them, and their uses.

BACKGROUND

The design of repellent surfaces has been subject of intense research that has led to the development of superhydrophobic surfaces, which show resistance to water, or superomniphobic surfaces, which show resistance to water and higher-surface tension organic liquids. Generally, the underlying principle of all these approaches is the reduction of contact points of a liquid droplet by the introduction of carefully designed roughness features to a solid surface. Hence, the general approach has been to make high aspect ratio structures, such as posts and pillars, that can control the amount of contact points with the material to be repelled. However, these structures suffer from poor mechanical stability and generally do not repel low-surface-tension liquids.

Recently, Applicants have developed lubricated liquid-infused porous materials that can repel even low-surface-tension aliphatic oils. These slippery liquid-infused porous surfaces (SLIPS) generally provide a porous substrate with high affinity to the lubricating liquid, so that the lubricating liquid layer is not displaced from the solid's surface. Such surfaces have shown to be highly repellent to a wide variety of materials providing extremely low sliding angles-even for liquids that form contact angles that are smaller than 90° on a flat substrate of the same material or the same surface functionalization and therefore generally wet and stick to most surfaces (e.g., low-surface-tension liquids). Compared to superhydrophobic materials that require high dynamic contact angles to allow a liquid to roll off the surface, such SLIPS structures eliminate this condition but capitalize on minimizing the contact angle hysteresis. However, such SLIPS structures can suffer from loss of the ultra-repellency as the lubricating liquid evaporates or shears away over time exposing the underlying porous substrate. Hence, previous efforts utilized adding a reservoir that can replenish the lubricating liquid.

SUMMARY

In certain embodiments, a repellent surface is disclosed. The repellent surface includes a substrate having a plurality of surface features containing re-entrant curvature, wherein the surface feature containing re-entrant curvature is capable of repelling liquids that form contact angles that are smaller than 90° on a flat substrate; and a lubricating liquid layer immobilized over said substrate having a plurality of surface features containing re-entrant curvature.

In certain embodiments, the surface features containing re-entrant curvature have a pore opening angle that is between 0 and 90°.

In certain embodiments, the surface features containing re-entrant curvature have a pore opening angle that is between 45 and 80°.

In certain embodiments, the surface features containing re-entrant curvature are interconnected.

In certain embodiments, the surface features containing re-entrant curvature are mechanically robust.

In certain embodiments, the surface features containing re-entrant curvature comprise interconnected pores.

In certain embodiments, the repellent surface is optically transparent.

In certain embodiments, the surface features containing re-entrant curvature are bound to the substrate.

In certain embodiments, surface features containing re-entrant curvature are obtained by an inverse structure of a monolayer of sacrificial colloidal particles.

In certain embodiments, the colloidal particles are substantially the same size.

In certain embodiments, the colloidal particles range in size from about 50 nm to more than tens of microns.

In certain embodiments, the substrate includes one or more curvatures.

In certain embodiments, a method of making a repellent surface is disclosed. The method includes forming a substrate having a plurality of surface features containing re-entrant curvature, wherein the surface feature containing re-entrant curvature is capable of repelling liquids that form contact angles that are smaller than 90° on a flat substrate;

and providing a lubricating liquid layer immobilized over said substrate having a plurality of surface features containing reentrant curvature.

In certain embodiments, forming a substrate having a plurality of surface features containing re-entrant curvature includes the following: forming a monolayer of colloidal particles over the substrate; filling the interstitial spaces between the colloidal particles of the monolayer to have a pore opening angle that is between 0 and 90°; and removing the monolayer of colloidal particles to obtain surface features containing re-entrant curvature.

In certain embodiments, the method further includes patterning regions of said surface features containing re-entrant curvature with chemical groups that repel said lubricating liquid.

In certain embodiments, the method further includes patterning regions of said surface features containing re-entrant curvature with chemical groups that attract said lubricating liquid.

BRIEF DESCRIPTION OF THE DRAWINGS

The following figures are provided for the purpose of illustration only and are not intended to be limiting.

FIGS. 16A to 16B shows different degree of roughness/order/defects that can be obtained by reducing the amount of TEOS used for filling in the interstitial spaces (i.e., back-filling) of the monolayer of close-packed colloids in accordance with certain embodiments;

DETAILED DESCRIPTION

Figure 1:
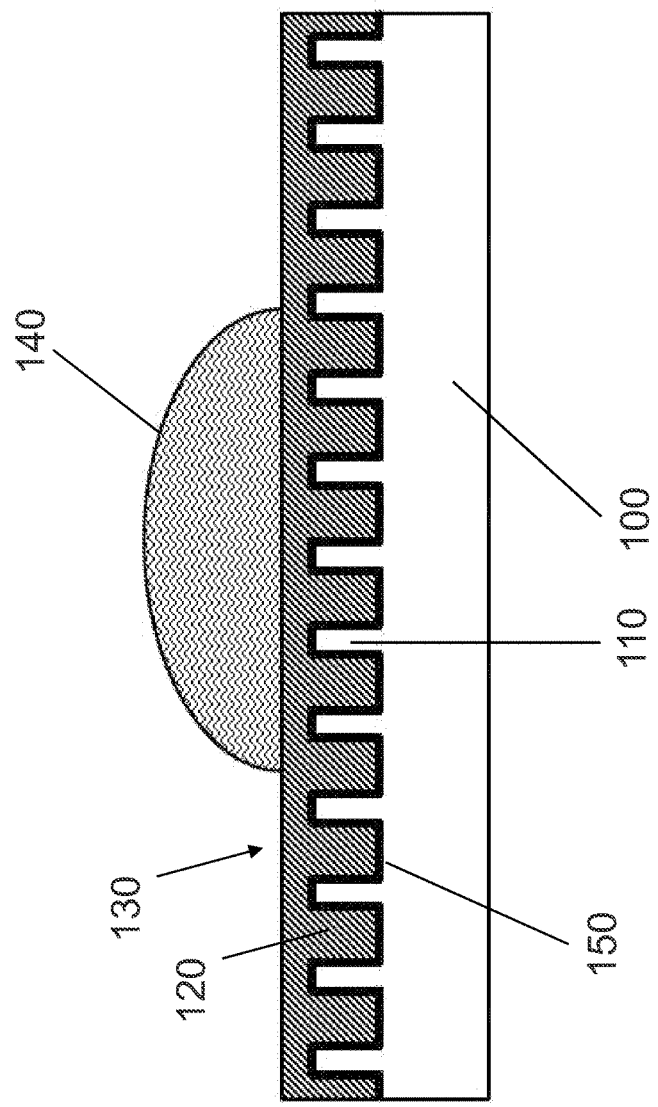
FIG. 1 shows a schematic illustration of a SLIPS surface formed over raised structures.

The patent and scientific literature referred to herein establishes knowledge that is available to those of skill in the art. The issued U.S. patents, allowed applications, published foreign applications, and references, that are cited herein are hereby incorporated by reference to the same extent as if each was specifically and individually indicated to be incorporated by reference.

For convenience, certain terms employed in the specification, examples and claims are collected here. Unless defined otherwise, all technical and scientific terms used in this disclosure have the same meanings as commonly understood by one of ordinary skill in the art to which this disclosure belongs. The initial definition provided for a group or term provided in this disclosure applies to that group or term throughout the present disclosure individually or as part of another group, unless otherwise indicated.

The present disclosure describes slippery surfaces referred to herein as Slippery Liquid-infused Porous Surfaces (SLIPS). In certain embodiments, the slippery surfaces of the present disclosure exhibit substance-repellent, drag-reducing, anti-adhesive and anti-fouling properties. The slippery surfaces of the present disclosure are able to prevent adhesion of a wide range of materials. Exemplary materials that do not stick onto the surface include liquids, solids, and gases (or vapors). For example, liquids such as water, aqueous solutions, oil-based or non-aqueous liquids, such as hydrocarbons and their mixtures, organic solvents, complex fluids such as crude oil, fluids containing complex biological molecules (such as proteins, sugars, lipids, etc.) and biological cells and the like can be repelled. The liquids can be both pure liquids and complex fluids. In certain embodiments, even liquids that form contact angles that are smaller than 90° on a flat substrate of the same material or the same surface functionalization (e.g., low-surface-tension liquids) can be repelled. In certain embodiments, SLIPS can be designed to be omniphobic, where SLIPS exhibit both hydrophobic and oleophobic properties. As another example, solids such as bacteria, insects, fungi and the like can be repelled or easily cleaned. As another example, solids such as ice, paper, sticky notes, or inorganic particle-containing paints, dust particles can be repelled or cleaned. SLIPS surfaces are discussed in International Patent Application Nos. PCT/US2012/021928, which entered U.S. National Stage through U.S. patent application Ser. No. 13/980,856 and published as U.S. Patent Publication No. 2014-0147627 and PCT/US2012/021929, which entered U.S. National Stage through U.S. patent application Ser. No. 13/980,858 and published as U.S. Patent Publication No. 2014-0187666 both filed Jan. 19, 2012, and U.S. Provisional Patent Applications 61/671,442 and 61/671,645, both filed Jul. 13, 2012, the contents of which are hereby incorporated by reference in their entireties.

SLIPS surfaces can be designed based on the surface energy matching between a lubricating fluid and a solid to form a stable liquid layer that is not readily removed from the surface. In some embodiments, SLIPS can be designed based on one or more of the following three factors: 1) the lubricating liquid can infuse into, wet, and stably adhere within the roughened surface, 2) the roughened surface can be preferentially wetted by the lubricating liquid rather than by the liquid, complex fluids or undesirable solids to be repelled, and therefore the lubricating layer cannot be displaced by the liquid or solid to be repelled, and 3) the lubricating fluid and the object or liquid to be repelled can be immiscible and may not chemically interact with each other. These factors can be designed to be permanent or lasting for time periods sufficient for a desired life or service time of the SLIPS surface or for the time till a reapplication of the partially depleted infusing liquid is performed.

The first factor (a lubricating liquid which can infuse into, wet, and stably adhere within the roughened surface) can be satisfied by using micro- and/or nanotextured, rough substrates whose large surface area, combined with physical and/or chemical affinity for the wetting liquid, facilitates complete wetting by, and adhesion of, the lubricating fluid, and its retention in the porous network due to strong capillary forces. More specifically, the roughness of the roughened surface, R, defined as the ratio between the actual and projected areas of the surface, may be any value greater than or equal to 1, such as 1 (flat surface), 1.5, 2, 5 or even higher.

To satisfy the second factor (that the roughened surface can be preferentially wetted by the lubricating liquid rather than by the liquid, complex fluids or undesirable solids to be repelled), a determination of the chemical and physical properties required for working combinations of substrates and lubricants can be made. This relationship can be qualitatively described in terms of affinity; to ensure that the Object A to be repelled (fluid or solid) remains on top of a stable lubricating film of the lubricating liquid, the lubricating liquid must have a higher affinity for the substrate surface than materials to be repelled, such that the lubricating layer cannot be displaced by the liquid or solid to be repelled. This relationship can be described as a "stable" region. As stated above, these relationships for a "stable" region can be designed to be satisfied permanently or for a desired period of time, such as lifetime, service time, or for the time till the replenishment/reapplication of the partially depleted infusing liquid is performed.

To satisfy the third factor (that the lubricating fluid and the object or liquid to be repelled can be immiscible and may not chemically interact with each other), the enthalpy of mixing between the two should be sufficiently high (e.g., water/oil; insect/oil; ice/oil, etc.) that they phase separate from each other when mixed together, and/or do not undergo substantial chemical reactions between each other. In certain embodiments, the two components are substantially chemically inert with each other so that they physically remain distinct phases/materials without substantial mixing between the two. For excellent immiscibility between a lubricating liquid and a liquid to be repelled, the solubility in either phase should be <500 parts per million by weight (ppmw). For example, the solubility of water in perfluorinated fluid (e.g., 3M Fluorinert™) is on the order of 10 ppmw; the solubility of water in polydimethylsiloxane (Liquid B, MW=1200) is on the order of 1 ppm. In some cases, SLIPS performance could be maintained transiently with sparingly immiscible liquids. In this case, the solubility of the liquids in either phase is <500 parts per thousand by weight (ppthw). For solubility of >500 ppthw, the liquids are said to be miscible. For certain embodiments, an advantage can be taken of sufficiently slow miscibility or mutual reactivity between the infusing liquid and the liquids or solids or objects to be repelled, leading to a satisfactory performance of the resulting SLIPS over a desired period of time.

A schematic of the overall design of Slippery Liquid-Infused Porous Surfaces (SLIPS) is illustrated in FIG. 1. As shown, the article includes a solid surface 100 having surface features 110 that provide a certain roughness (i.e. roughened surface) with lubricating liquid 120 applied thereon. The lubricating liquid wets the roughened surface, filling the hills, valleys, and/or pores of the roughened surface, and forming an ultra-smooth overlayer 130 over the roughened surface. In some embodiments, the overlayer 130 follows the topography of the roughened surface (e.g., instead of forming a smooth overlayer that overcoats all the textures). For example, the lubricating liquid may follow the topography of the structured surface if the equilibrium thickness of the lubricant layer is less than the height of the textures.

Due to the immobilized overlayer 130 resulting from wetting the roughened surface with the lubricating liquid 120, repellent material 140 does not adhere to the surface. In certain embodiments, the surface features 110 can be functionalized with one or more functional moieties 150 that further promote adhesion of the lubricating liquid 120 to the surface features 110. In certain embodiments, the functional moieties 150 can resemble the chemical nature of the lubricating liquid 120. In certain embodiments, the surface features 110 can be functionalized with one or more functional moieties 150 that are hydrophobic.

Figure 2A:
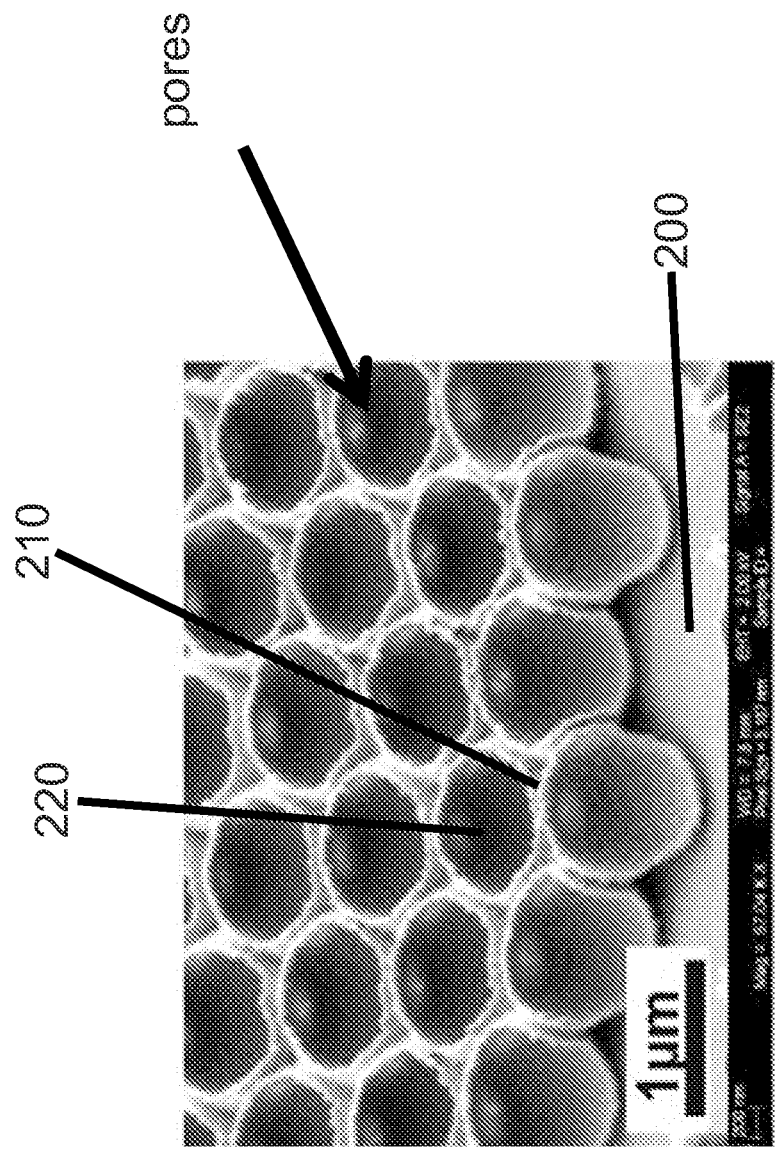
FIGS. 2A and 2B show surface features formed over the solid surface having re-entrant curvatures in accordance with certain embodiments.

The present disclosure provides a solid surface having particular surface features that unexpectedly provide superior properties over those of existing SLIPS structures. As illustrated in FIG. 2A, the surface features 210 have a plurality of re-entrant curvature to form an array of tea-pot like structures with pores 220 arranged over the solid surface 200. As shown, the surface features 210 are interconnected with each other between the pores 220. Moreover, the pores 220 are interconnected with one another to provide channels for the lubricating liquid to flow in throughout the porous network.

Figure 2B:
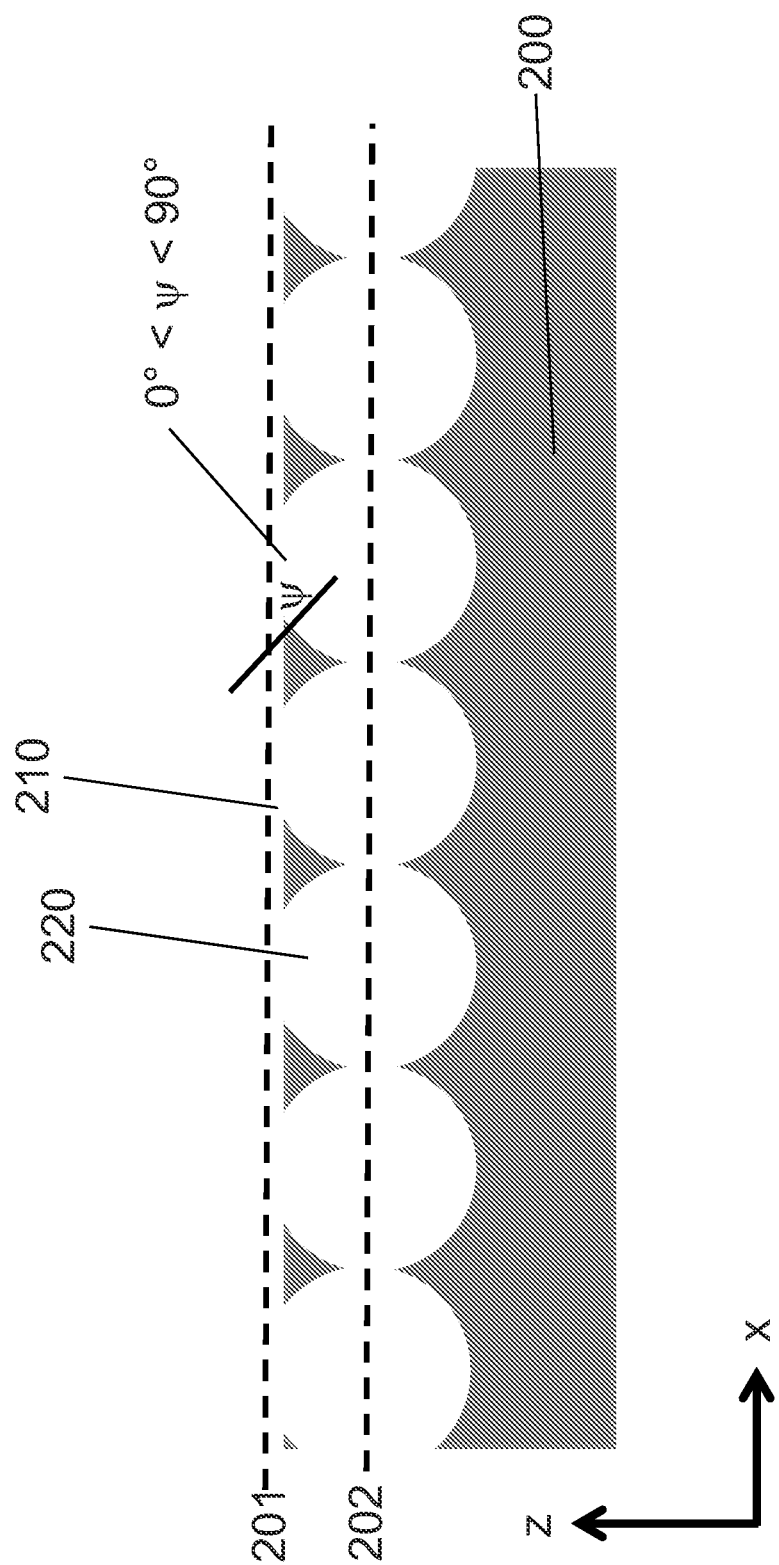
Figure 2C:
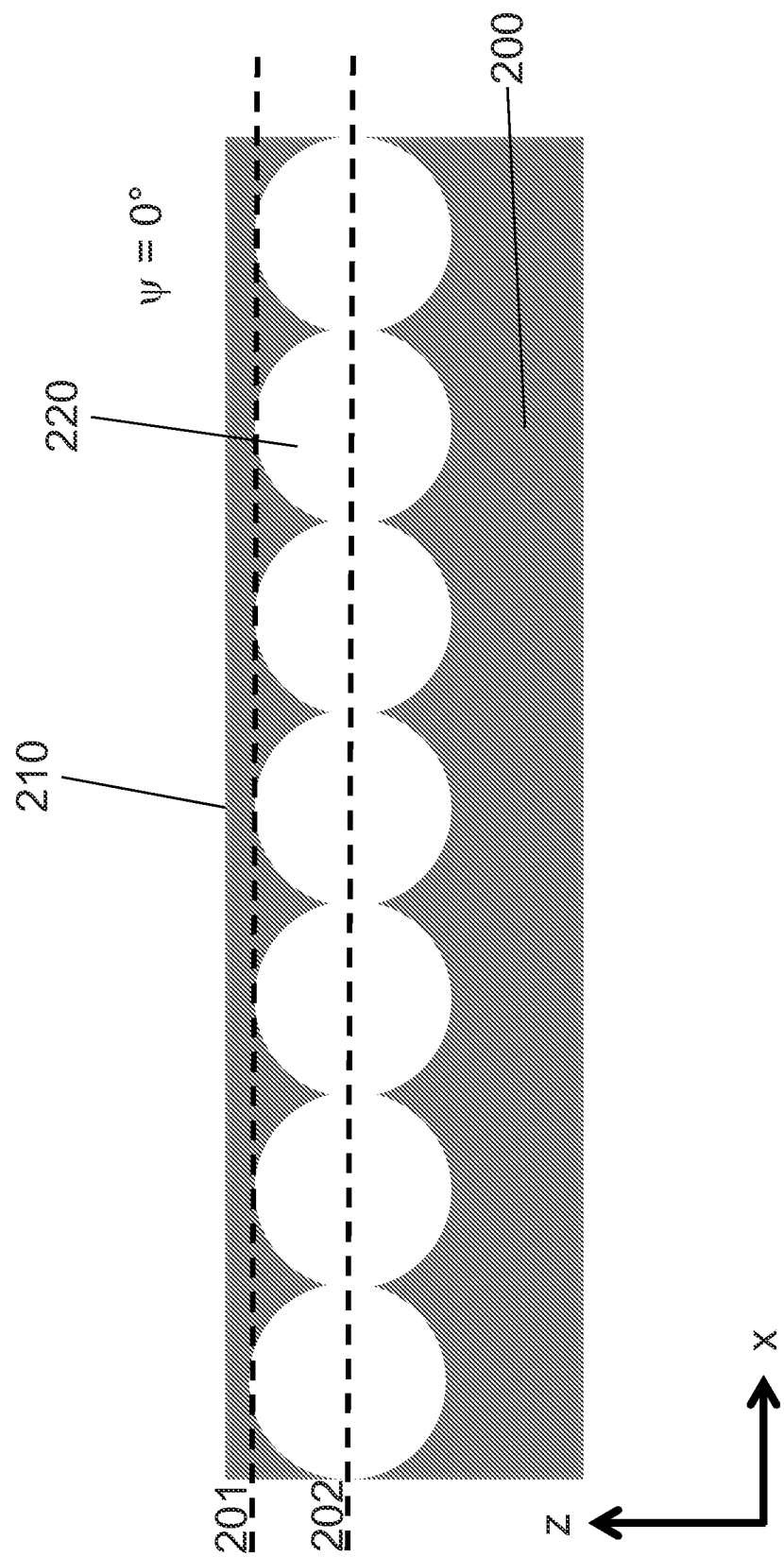
FIGS. 2C and 2D show surfaces that do not have surface features with re-entrant curvatures.

FIG. 2B is a schematic cross section of one exemplary surface features 210 formed over the solid surface 200, such as when viewed along the direction y of FIG. 2A. Particularly, the surface features 210 shown in FIG. 2B includes re-entrant curvature structures that form between the two dashed lines 201 and 202 shown on FIG. 2B. The top dashed line 201 is drawn at the point where the pores 220 would be completely closed off, such as that shown in FIG. 2C. The bottom dashed line 202 is drawn through the diameter of the individual circular pores 220, as shown in FIG. 2C. Surface features 210 that form between the dashed lines 201 and 202 would provide the desired re-entrant curvature.

However, structures that completely close off the pores 220, such as shown in FIG. 2C, would not be suitable structures as the desired pores 220 would not be available for the lubricating liquid. Moreover, surface features 210 that do not extend beyond the bottom dashed line 202 shown in FIG. 2B, such as that shown in FIG. 2D, while porous, do not provide the desired re-entrant curvature.

While only a monolayer of the surface feature is shown in FIGS. 2A-2D, it should be noted that multiple layers of the surface features can be utilized provided that the uppermost layer of the surfaces form a generally uniform layer (or with an acceptable amount of defects), and the uppermost surface features possess re-entrant curvature. In certain embodiments, surface features 210 having re-entrant curvature can be formed over other porous structures without any re-entrant curvature provided that the uppermost layer of the surfaces form a generally uniform layer (or with an acceptable amount of defects), and the uppermost surface features possess re-entrant curvature.

Figure 2D:
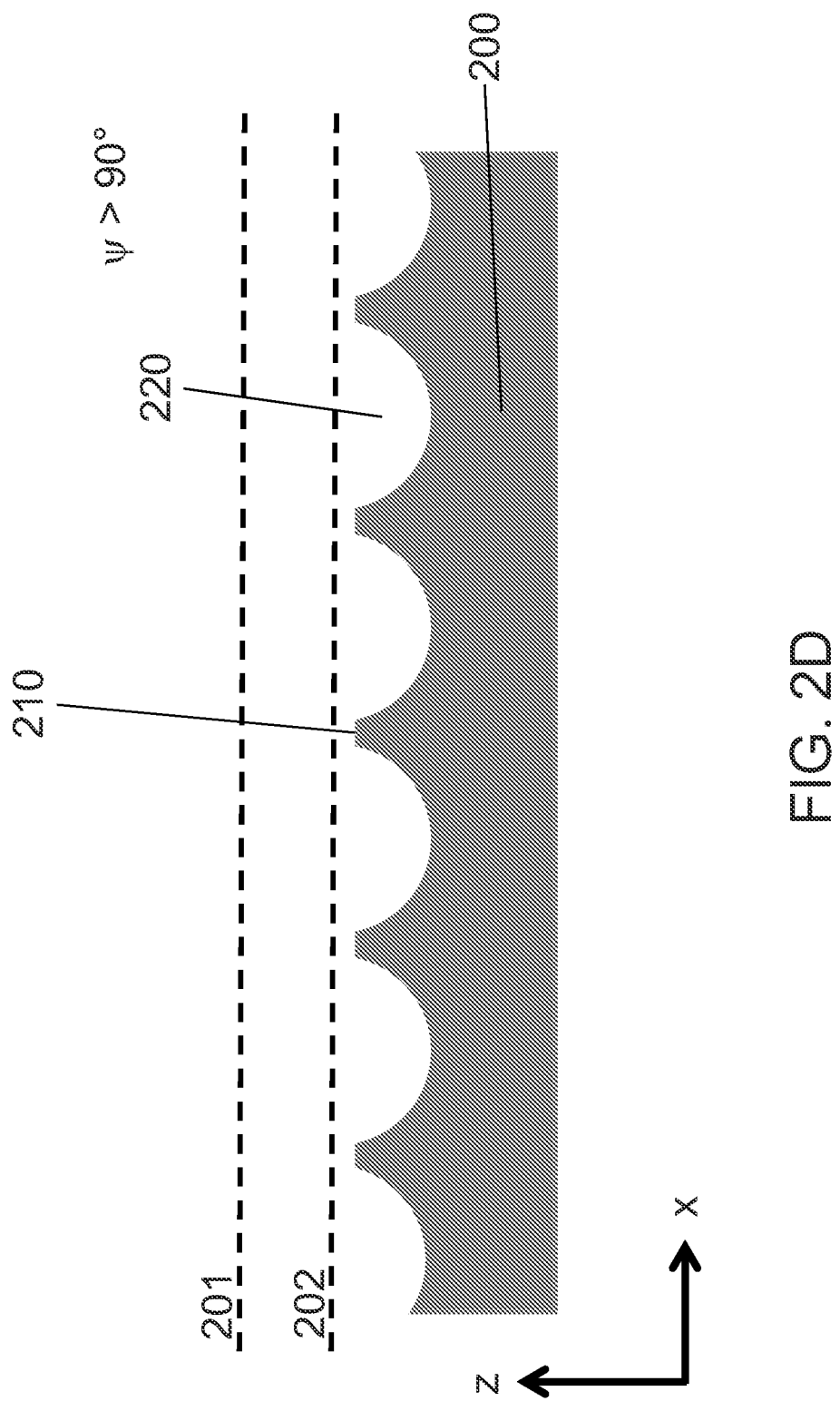

By way of convention, surface features 210 that are closed off and touch or extend beyond the upper dashed line 201 (as shown in FIG. 2C) will be referred to as surface features 210 having opening pore angle ($\psi$) of 0°. Similarly, surface features 210 that touch or fall below the bottom dashed line 202 (as shown in FIG. 2D) will be referred to as surface features 210 having an opening pore angle ($\psi$) of 90° or higher, respectively. Hence, surface features 210 that have an opening pore angle between 0° and 90° can be considered to have re-entrant curvature. FIG. 2B shows an exemplary opening pore angle $\Psi$ that is between 0° and 90° where the surface features form between the upper dashed line 201 and a tangent off of the uppermost surface feature 210.

In certain embodiments, the surface features 210 having re-entrant curvature are interconnected with each other. In certain embodiments, the surface features 210 having re-entrant curvature are interconnected with each other so that they form a closed-cell structure and the pores 220 are isolated from one another, at least in the topmost part of the coating. However, in many instances, the pores can be connected to other pores below the topmost part of the structure. For example, surface features 210 having an inverse hexagonal packed structure that repeat over long distances form structures that are interconnected with each other so that they form a closed-cell structure and the pores 220 are interconnected with one another as shown in FIG. 2B.

In certain embodiments, the surface features 210 can be selected to optimize mechanical properties. For example, without wishing to be bound by theory, interconnected closed-cell top layer of the structures may provide enhanced mechanical robustness to damage and the like. In certain embodiments, the surface features may be covalently, ionically, or strongly adhered to the underlying substrate by any appropriate means so that when a force is applied, the surface features can remain affixed to the underlying substrate.

In certain embodiments, the surface features 210 can be selected to reduce evaporation rate of the lubricating liquid. While not wishing to be bound by theory, structures having smaller pore opening angles may be able to reduce or retard the evaporation of the largely enclosed lubricating liquid.

In certain embodiments, the size of the surface features 210 can be selected to obtain one or more desired optical properties. For example, the size of the surface features can be chosen to provide transparency in visible or infrared wavelengths, such as by selecting surface features that are small enough to prevent scattering with the wavelengths of interest, such as below 200 nm for a dry coating and 400 nm for a lubricated coating.

In certain embodiments, the size scale of the surface features 210 may range from about 50 nm to more than tens of micrometers. The selected size scale may be chosen based on other conditions as fabrication conditions, materials utilized for fabrication, desired final mechanical properties, desired final optical properties, and the like.

Figure 2E:
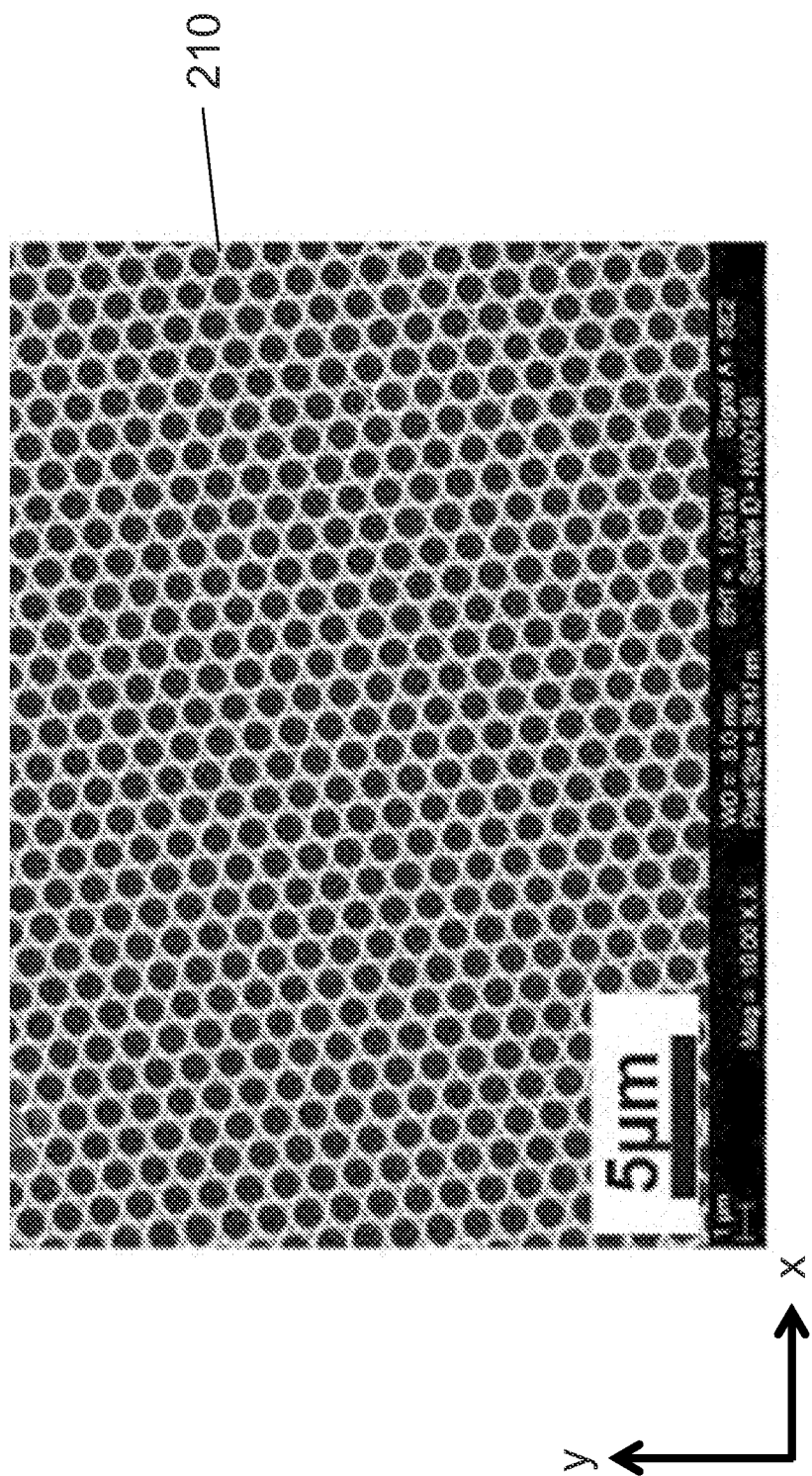
FIGS. 2E through 2J show exemplary surfaces having surface features with re-entrant curvatures in accordance with certain embodiments.
Figure 2F:
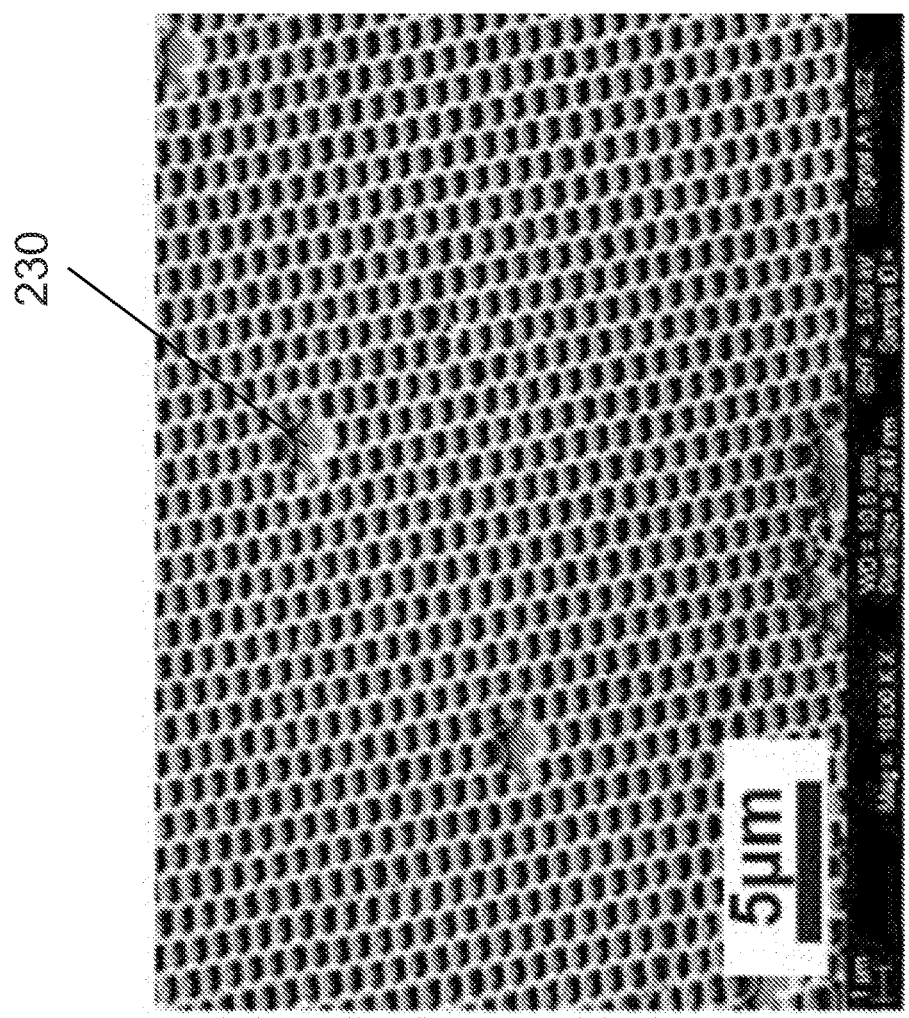
Figure 2G:
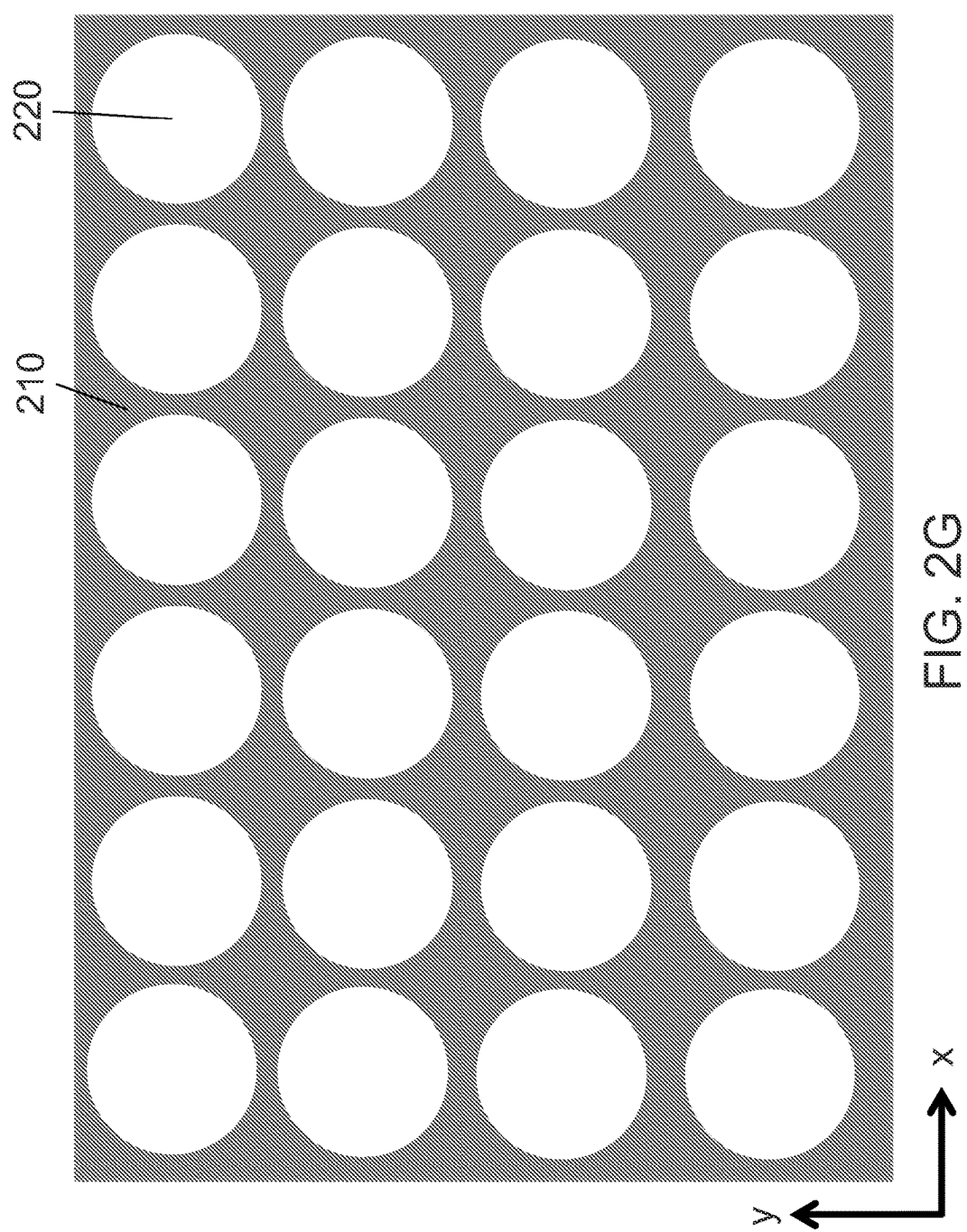
Figure 2H:
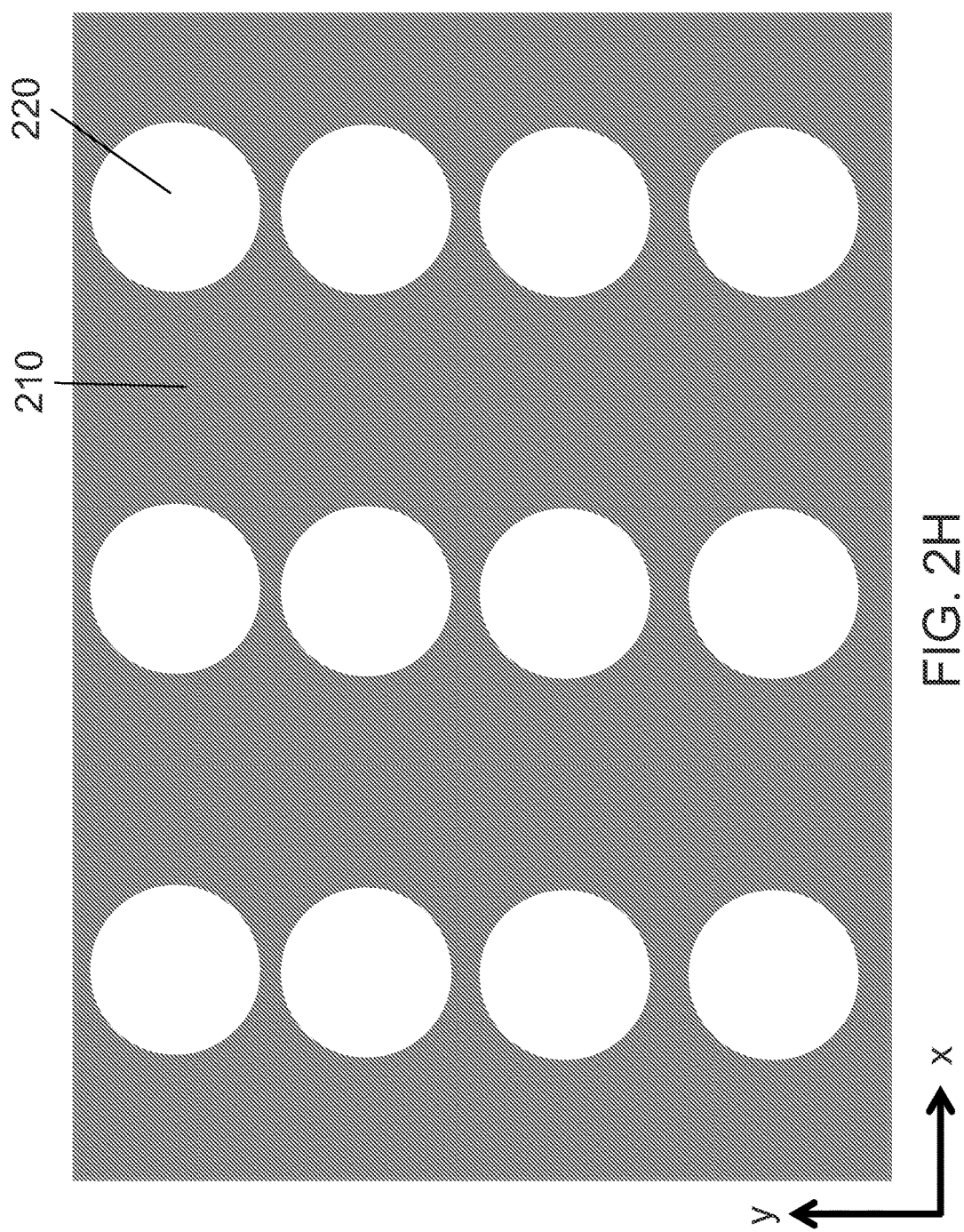
Figure 2I:
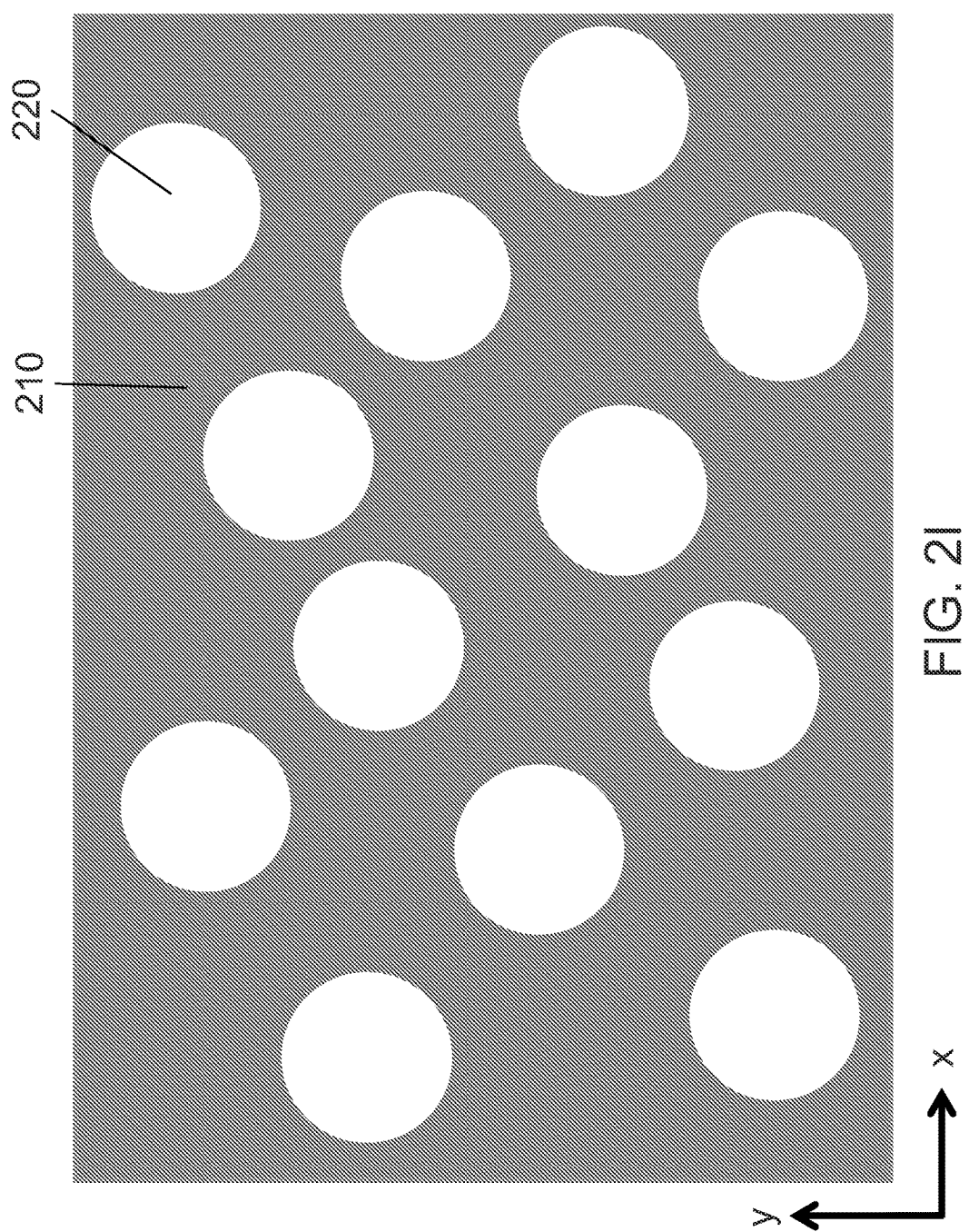

In certain embodiments, the surface features 210 have an inverse hexagonal packed structure that repeats over long distances. For example, FIG. 2E shows a top-down view of the surface features showing large degree of inverse hexagonal packed surface features 210. However, the structure need not be perfect and some degree of defects 230 to the inverse hexagonal packing are acceptable, as shown in FIG. 2F. As will be shown below (FIGS. 16-19), the structures are highly defect-tolerant. It should be noted that while inverse hexagonal packed structure is shown in FIGS. 2E and 2F, any other type of structures, such as cubic (see FIG. 2G), rectangular (see FIG. 2H), or even completely disordered structures (see FIG. 2I), are possible. Order is not a requirement for the coating, as long as the top pore structures exhibit re-entrant features with $0° < \psi < 90°$.

Figure 2J:
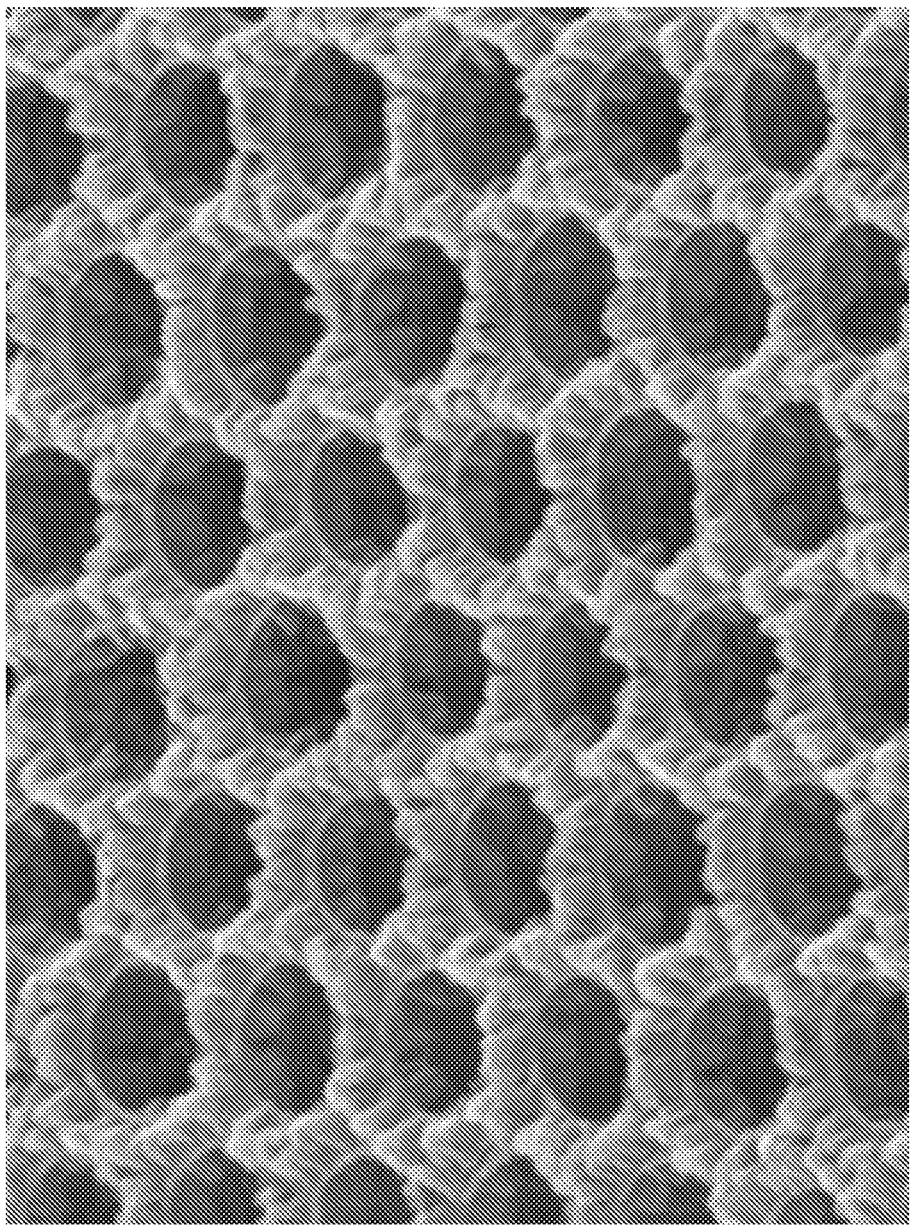

Many other type of structures having re-entrant curvature can be fabricated. For example, a closed-cell hexagonal array of structure without re-entrant curvature can be fabricated, followed by the formation of "overhangs" over the hexagonal array. For example, FIG. 2J shows a porous inverse opal template covered with conductive polymer nanofibers as the "overhangs" to provide re-entrant curvature.

It has been found that such surface features 110 having re-entrant curvature, such as those described in FIGS. 2A, 2B, 2E, 2F, 2G, 2H, 2I, and 2J, provide unexpectedly superior results.

First, traditional SLIPS structures can suffer from loss of the ultra-repellent characteristics over time as the lubricating liquid evaporates away. As such, when utilizing volatile lubricating liquids, prior solutions focused on providing a reservoir or a replenishing source to add the lubricating liquid back to the system. However, by utilizing surface features having re-entrant curvature, even if the lubricating liquid evaporates away so that the surface features 210 having reentrant curvature are exposed, the underlying exposed surface features 210 can be designed to provide a highly repellent surface. Despite the fact that such exposed surface features 210 having re-entrant curvature may not be as highly repellent as the SLIPS structures, such exposed surface features 210 having re-entrant curvature can nevertheless repel a wide range of materials, as they begin to show superior superhydrophobic features. The exposed surface features 210 having re-entrant curvature can be tailored to repel even liquids that form contact angles that are smaller than 90° on a flat substrate of the same material or the same surface functionalization (e.g., low-surface-tension liquids), which is a further improvement over traditional superhydrophobic surfaces. Particularly, by utilizing surface features 210 having a re-entrant curvature, the amount of contact points with the material to be repelled can be controlled and tuned as desired to control the degree of repellency. In certain embodiments, the surface features 210 having re-entrant curvature can repel liquids having surface tensions that are below 50, 30, 25, or even below 22 mN/m when the structures are exposed after removal of the lubricating liquid.

In contrast, SLIPS structures formed using, for example, surface features utilized in traditional SLIPS structures (e.g., fabrics, hexagonal honeycomb without re-entrant curvature, posts, etc.) do not provide the similar benefits. First, as the structures lose the lubricating liquid, the exposed surface features can become superhydrophobic surfaces. However, without the re-entrant curvature, such structures cannot repel low-surface-tension liquids and organic liquids can infiltrate the structures and become significantly pinned.

Without wishing to be bound by theory, the reason for the failure of the structures without re-entrant curvature to repel liquids that form contact angles that are smaller than 90° on a flat substrate of the same material or the same surface functionalization (e.g., low surface tension liquids) may lie in the inability to maintain a Cassie-Baxter wetting state with liquids that possess a contact angle lower than 90° on a flat surface with similar surface chemistry. Except for water and some organic liquids with comparably high surface tensions (e.g. ethylene glycol, diiodomethane), the vast majority of organic liquids will not form a contact angle exceeding 90° on any flat surface. Therefore, such surfaces will not be able to repel the liquid. On the contrary, as the liquid infiltrates the surface topography, strong pinning is induced, leading to wetting and staining of the surface.

A Cassie-Baxter state refers to a wetting situation where the liquid sits on top of a surface topography and thus forms a solid/air-liquid composite interface. Repellency is induced as the contact points between liquid and solid structures is minimized, and the liquid is able to roll off the surface.

Second, as the structures described in this disclosure are interconnected with one another, they provide improved mechanical stability. Surprisingly, despite the fact that the surface features 210 having re-entrant curvature can have features as small as tens of nanometers, robust mechanical stability is observed. In certain embodiments, such structures having mechanical robustness can withstand damage from various different stresses encountered during use, such as by touching, wiping with a tissue, peeling off using scotch tape and the like. In particular, structures, such as that shown in FIG. 2E, provide all the mechanical advantages of the mechanically superior honeycomb structural materials. In contrast, when isolated, not interconnected structures, such as posts and pillars are utilized as the surface features 210, such structures are not mechanically stable and highly fragile, and can lose such superhydrophobic or SLIPS properties with even mild mechanical damage. However, as the surface features described herein are interconnected with one another, significant improvements to mechanical stability can also be provided.

Third, in certain embodiments, not only are the structures interconnected with one another to provide improved mechanical stability, the pores between the structures can also be interconnected with one another. This provides the further advantage over conventional structures having a hexagonal array where the pores are isolated from one another. Namely, the lubricating liquid can more easily flow to other pores and provide improved repellent properties, as well as self-healing characteristics. Hence, while conventional hexagonal array structures may provide improved mechanical stability, they can suffer from providing the optimal repellency characteristics over extended period of use. The structures described herein can overcome such shortcomings of the conventional structures.

Fourth, in certain embodiments, fabrication of certain re-entrant curvature structures, such as the inverse monolayer of colloidal templates provide improved fabrication characteristics. Most superhydrophobic surfaces, such as posts, pillars, and even closed hexagonal arrays are fabricated using lithographic techniques, which require expensive machines. The fabrication techniques described herein can be carried out without any such expensive equipment and are generally simply to carry out. Particularly, the fabrication techniques described herein can be carried out on non-flat substrates, such as curved surfaces, rippled surfaces, randomly varying surfaces, arbitrarily shaped objects, and the like. Hence, they can be fabricated over curved objects, such as lenses, and the like.

Fifth, particularly for application that involve shear forces, the surface features 210 having re-entrant curvature can provide improved stability against shear erosion of the lubricating liquid as the surface features 210 having re-entrant curvature are able to better capture, enclose and retain the lubricating liquid as compared to traditional SLIPS structures, such as posts and pillars.

Sixth, the size of the surface features 210 having re-entrant curvature can be tuned over a wide range and can be designed to be small enough to not interfere with light of visible wavelengths and even to enhance the transmission of light, leading to omniphobic, optically clear coatings required in many applications where transparency of the surface is critical.

The surface features 210 having re-entrant curvature provide the combination of several or all of these advantageous properties, while previous structures employed in earlier SLIPS structures were not able to provide the combination of all, let alone even several, of these advantageous properties.

In certain embodiments, surface features 210 having re-entrant curvature can be formed by filling in the interstitial spaces of a monolayer of templating materials, such as spheres, ellipsoids, concave and convex shaped objects, saw-tooth patterns, irregular shapes not possessing re-entrant curvature (e.g., inverted triangles that are oriented with its base toward the surface) and the like and removing the templating material thereafter.

Figure 3A:
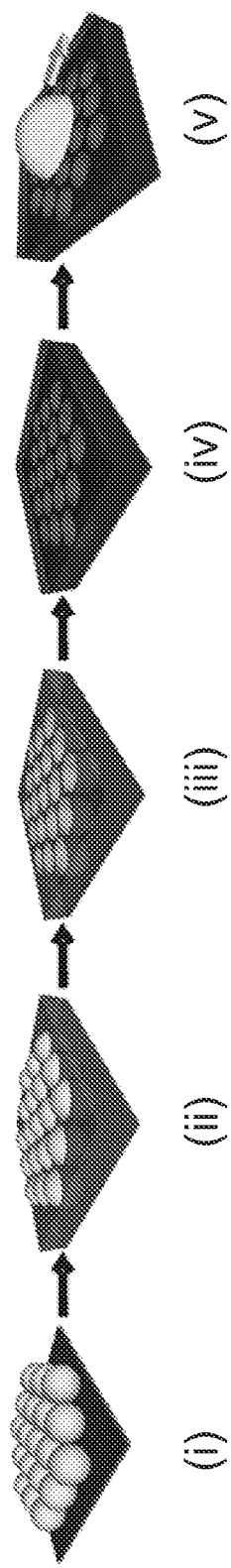
FIG. 3A shows a schematic illustration for forming a SLIPS surface over surface features having re-entrant curvatures in accordance with certain embodiments.

FIG. 3A schematically illustrates one exemplary method for the fabrication of SLIPS substrates using surface features that have re-entrant curvature.

First, as shown in (i), a monolayer of colloidal particles can be provided over a solid substrate. Although a hexagonal close packed colloidal structure is shown as an example, other structures are possible. To form a monolayer of colloidal particles, many different techniques can be employed. For example, a Langmuir trough can be utilized to form a monolayer of colloids on an air-liquid interface which can then be transferred to a solid substrate. (Vogel et al. Advanced Functional Materials 2011, 21, 3064). Alternatively, the colloidal dispersion can be floated onto a crystallization dish until the surface is completely covered with a colloidal monolayer (Vogel et al, Macromol. Chem. Phys. 2011, 212, 1719). Many existing methods to crystallize monolayers on solid substrates (for a review see Vogel et al, Soft Matter 2012, 8, 4044) can be used as well. Such methods include but are not limited to convective and evaporative assembly techniques, spincoating, spray coating, doctor blading, sedimentation, assembly from interfaces and transfer, electrodeposition, electrostatic and electrophoretic assemblies. The colloidal particles can be formed using a wide range of different materials, such as polymeric materials, (e.g., polystyrene, polymethylmethacrylate, crosslinked polystyrene, crosslinked polymethylmethacrylate, and the like), inorganic materials (e.g., silica, titania, and the like), inorganic salts, fragments of different materials (e.g., ground powders, etc.) or combinations thereof. The colloidal particles can be monodisperse or polydisperse. The colloidal particles may be spherical, elliptical or of irregular shape.

Then, as shown in (ii), the assembled colloid particles can be backfilled with a desired material. Generally, any kind of material having a chemical contrast with the templating colloidal particles can be used. For example, when organic colloids are used, the material used as the backfilling material can be of such a material that the colloid material can be removed without inducing damage to the matrix. As another example, the templating colloidal material and backfilling material are not soluble in the same solvent or do not have the same melting or decomposition temperature. Some exemplary backfilling material include silicon dioxide, titania, aluminia, zirconia and other sol-gel processable materials, polymeric materials, nanoparticulate materials of any composition, solution of carbon nanotubes, graphene sheets, and the like. In certain embodiments, a suitable precursor material can be utilized to backfill and a subsequent conversion step can convert the precursor material to the desired material. Some exemplary suitable precursors include tetraethyl-orthosilicate solution, tetramethyl-orthosilicate, titanium isopropoxide, titanium butoxide, water glass, cross-linkable polydimethyl siloxane, polyvinylalcohol, polyvinylpyrrolidone and other polymers with solubility different from the colloids, silicon dioxide nanoparticles, titania nanoparticles, metal nanoparticles, carbon nanotubes, amorphous carbon particles, graphene, and the like.

In certain embodiments, the backfilling material can provide additional functionality to the final structure. For example, the backfilling material can be made of elastomeric materials and hence become stretchable (typically but not limited to PDMS as substrate and backfilling material). As another example, the backfilling material can be made swellable with solvents, especially the lubricant to create a nanoscale, re-entrant coating with the added benefit of a lubricant reservoir (i.e. the bulk substrate). As yet another example, the backfilling material could be made responsive to external stimuli: e.g. to temperature, light, (pH if water is used as lubricant) to reversibly collapse and expand the coating to control wetting properties.

Then, as shown in (iii), the colloidal particles can be removed, such as through combustion, etching, dissolution, melting, and the like, using processes and conditions that eliminate the sacrificial colloidal particles but do not change the matrix, to obtain the inverse structure. In certain embodiments, the surface features can optionally be functionalized to promote favorable attractive interactions with the lubricating liquid, such as by using activation, for example by oxygen plasma, acid or base piranha treatment and silanization. Other exemplary surface functionalization can render the surface features hydrophilic, hydrophobic, oleophobic, oleophilic, or fluorophilic by silanization reactions.

Then, as shown in (iv), the lubricating liquid can be added to provide a lubricating layer immobilized over the surface features having re-entrant curvature. Some exemplary suitable lubricating liquid includes perfluorinated hydrocarbons, organosilicone compound (e.g. silicone elastomer), hydrophobic materials, and the like. In particular, the tertiary perfluoroalkylamines (such as perfluorotri-npentylamine, FC-70 by 3M, perfluorotri-n-butylamine FC-40, etc), perfluoroalkylsulfides and perfluoroalkylsulfoxides, perfluoroalkylethers, perfluorocycloethers (like FC-77) and perfluoropolyethers (such as KRYTOX family oflubricants by DuPont), perfluoroalkylphosphines and perfluoroallcylphosphineoxides as well as their mixtures can be used for these applications, as well as their mixtures with perfluorocarbons and any and all members of the classes mentioned. In addition, long-chain perfluorinated carboxylic acids (e.g., perfluorooctadecanoic acid and other homologues), fluorinated phosphonic and sulfonic acids, fluorinated silanes, and combinations thereof can be used as the lubricating liquid. The perfluoroalkyl group in these compounds could be linear or branched and some or all linear and branched groups can be only partially fluorinated. In certain embodiments, hydrophobic materials such as olive oil, silicone oil, hydrocarbons, and the like can be utilized as the lubricating liquid. In certain embodiments, ionic liquids can be utilized as the lubricating liquid.

Thereafter, as shown in (v), a SLIPS structure with high repellency can be obtained.

Figure 3B:
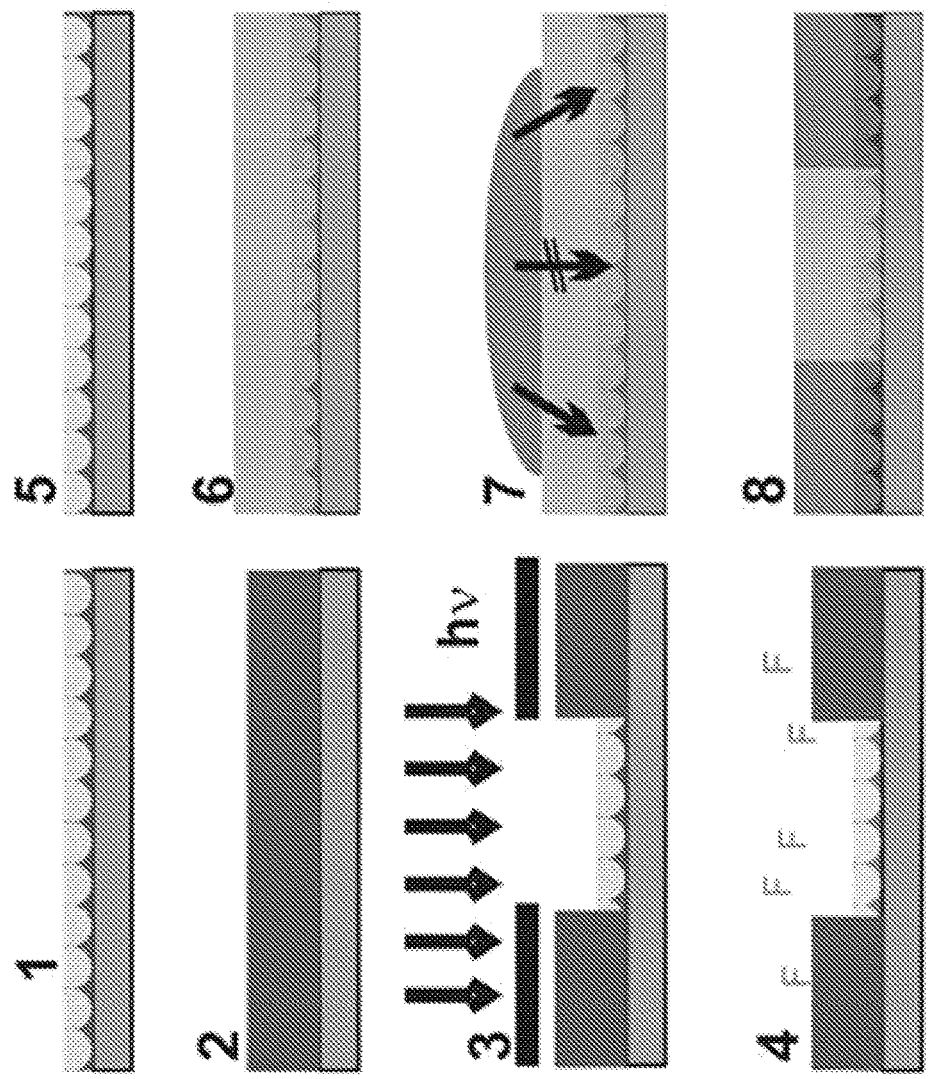
FIG. 3B shows a schematic illustration for forming a patterned SLIPS surface over surface features having re-entrant curvatures in accordance with certain embodiments.

Many different optimization and further treatments to the SLIPS structure can be carried out. For example, in certain embodiments, patterns comprised of SLIPS and non-SLIPS surface areas can be created on the substrates based on providing surface features 110 that have different affinity to the lubricating liquid, so that certain regions are preferentially wetted by the lubricating liquid while other regions are not. These patterns can be created by photolithographic methods, followed by selective hydrophobization of the exposed parts of the surface. For example, as shown in FIG. 3B, an inverse monolayer substrate (1) can be coated with photoresist (2), irradiated and developed to create the desired surface pattern (3). Vapor-phase silanization can be applied to create fluorinated surface functionalities at the exposed surface regions (4); the protected surface regions can remain unfunctionalized after removal of the photoresist (5). Due to its low surface energy, addition of lubricating liquid can first create a homogeneous liquid film on the surface (6). Then, addition of a second repellent liquid (7) can lead to a selective replacement of the lubricating liquid at the unfunctionalized surface areas (8).

Figure 3C:
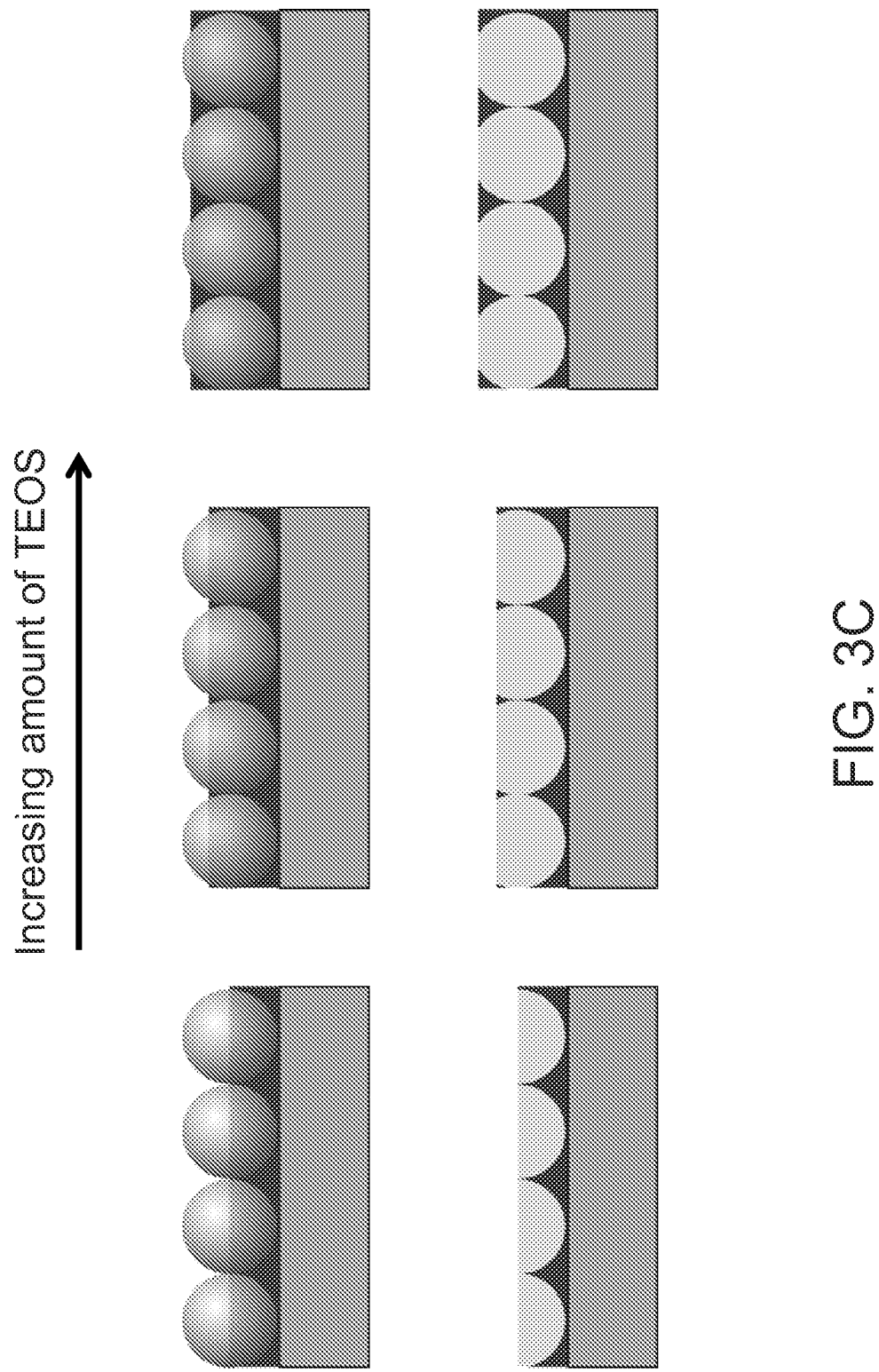
FIG. 3C shows a schematic illustration for controlling the formation of surface features having re-entrant curvatures in accordance with certain embodiments.

Moreover, the degree of pore opening angle may be controlled to provide a desired set of properties. For example, depending on the pore opening angle, different amounts of repellency when the lubricating liquid has been removed may be obtained. FIG. 3C shows one exemplary method of controlling the degree of pore opening angle. As shown, the amount of backfilling material (e.g., tetraethylorthosilicate or TEOS) can be adjusted to control the pore opening angle. Alternatively, the amount of backfilling material may be kept constant while changing the area coverage and/or size of the particles. Alternatively, the entire monolayer can be overcoated above the colloids, and then etched down to reveal the required opening and re-entrant geometry.

Other methods to fabricate such structures having re-entrant curvature are possible. For example, a non-reentrant curvature coating can be imprinted or fabricated. Then, selective growth on top parts of the structure can be carried out, such as using electroplating. Alternatively, selective removal, melting, or etching of the top parts of such structure with non-reentrant curvature can be carried out to create structures having re-entrant curvature.

In other embodiments, a composite structure having embedded spherical or elliptical particles can be fabricated, such as that shown in FIG. 2C. Then, the matrix can be etched away down to the depth that is above the dashed line 202, such as shown in FIG. 2B.

EXAMPLES

Example 1

One exemplary process of generating transparent SLIPS coatings on glass with colloidal monolayers is described in detail below.

Materials

The lubricating fluids used for the experiment were the perfluorinated fluids DuPont Krytox® 100 and 103. Unless otherwise specified, Krytox 100 was used throughout the experiments. The test liquids were obtained from Sigma Aldrich and used without further purification. Deionized water with a resistivity of 18.2 MΩ·cm was used in all cases. Heparinized sheep blood was purchased from Hemostat Laboratories, CA, USA and used within one week to avoid coagulation. The hydrophobic dye used to stain octane, product name DFSB-K175, was purchased from riskreactor.

Structure Generation

Monolayer Formation on Glass

Colloidal monolayers were crystallized on the air-water interface of a crystallization dish following a protocol from literature (Vogel et al. Macromol. Chem. Phys. 2011, 212, 1719). In brief, a colloidal dispersion in 1:1 water/ethanol (solid content approx. 2.5%) was spread onto the interface via a glass slide until the surface was completely covered. The substrate was then inserted into the subphase and monolayer deposited manually by fishing out the slide. After drying, a closed-packed monolayer uniformly covered the substrate.

Formation of the Inverse Monolayer

A solution of tetraethylorthosilicate (TEOS), HCl (0.1 mol/l) and ethanol with weight ratios of 1:1:1.5 was prepared and stirred for 1 h. Then, it was diluted with ethanol (for dilution ratios, see Table 1) and spin-coated onto the monolayer-covered substrate (3000 rpm, 30 s, acceleration 500). The colloids were removed by combustion at 500° C. (ramped from RT to 500° C. for 5 h, 2 h at 500° C.).

TABLE 1

Mixture ratios between TEOS and Ethanol used for spincoating

| Colloid size | TEOS:Ethanol ratio (volume) |
|---|---|
| 1000 nm | 1:0.9 |
| 415 nm | 1:4 |
| 225 nm | 1:6 |
| 138 nm | 1:9 |

Figure 4:
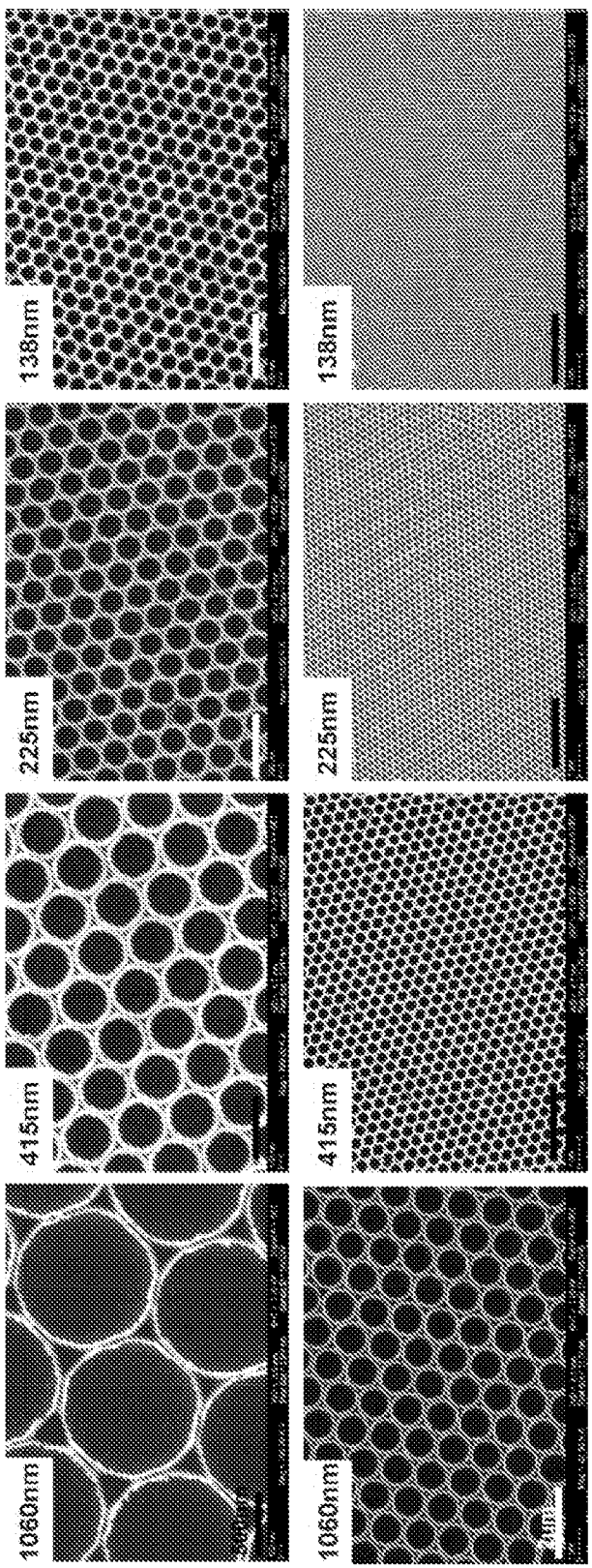
FIG. 4 shows SEM images of the inverse monolayer structures prepared from colloids with sizes as specified in the insets, in accordance with certain embodiments.

Examples of the surface structures are shown in FIG. 4 that shows SEM images of the inverse monolayer structures prepared from colloids with sizes as specified in the insets. The process would also work with any other inorganic sol-gel processes (e.g. titania or alumina precursor solutions) as well as with different polymers or nanoparticles or nanotubes that could be used to fill the interstitial spaces of the monolayer. Besides spin-coating, drop casting, dip coating, spray coating, electrostatic and electrophoretic deposition or chemical vapor deposition could also be used. The colloids can also be removed at room temperature using organic solvents (THF, Toluene or other solvents that dissolve the colloid polymers). Table 1 lists exemplary mixture ratios between TEOS and Ethanol used for spincoating.

Fluorosilanization

Fluorosilanization was carried out by vapor-phase deposition of (1H,1H,2H,2H-tridecafluorooctyl)-trichlorosilane or decyltrichlorosilane for 24 h at reduced pressure and room temperature. Prior to silanization, the substrates were cleaned in acid piranha (3:1 sulfuric acid:hydrogen peroxide) and plasma treated with oxygen plasma for 10 min.

It should be noted that similar results can also be achieved with different fluorosilanes. Required times can be reduced by changing the temperature. Acid and plasma cleaning provide redundant cleaning and could be simplified or omitted.

Lubrication

10 μl/cm$^2$ Krytox 100 (or water or olive oil) was added to the substrate and uniform coverage was achieved by tilting. Excess lubricating liquid can be removed by vertical placement of the substrates. For the long-term experiment, the more viscous Krytox 103 was used to minimize the evaporation of the lubricating liquid.

Timeline

An exemplary preparation process can be carried as follows. Optimizations are possible: some optimization suggestions are given in brackets 1. Monolayer assembly and transfer: 10 min
2. Drying of the monolayer: 30 min (using elevated temperatures, the time can be reduced to a few minutes)
3. TEOS solution preparation: 60 min (changing the pH and the TEOS content, this could be reduced to several minutes)
4. TEOS/EtOH solution spin-coating: 35 s
5. Combustion of colloids: 6 h (could be done by solvent: <1 min)
6. Substrate cleaning:
    a. Acid piranha: 2 h b. Plasma treatment: 10 min (using both processes may be redundant, similar results can be expected using only 5 min plasma treatment: as was done for patterned samples)
7. Fluoro-silanization: 24 h (using higher vacuum and elevated temperatures, the process could be reduced to approx. 1 h)

Total time: ~34 h

Total time estimated for an optimized process: ~90 min

Example 2

Demonstration of SLIPS Characteristics

This example demonstrates that lubricated inverse monolayer substrates provide an extreme reduction of adsorption of a variety of liquid-borne contaminants. While not wishing to be bound by theory, such high repellency may be caused by the absence of adhesive contact points between the contaminated liquid and the solid surface due to the presence of the lubricating liquid layer, which provides a slippery, defect-free interface.

In general, a major source of surface contamination arises from adsorption of liquid-borne contaminants to a solid surface in contact with the liquid. Such contamination not only stains common surfaces in every-day life but, when proteins or bacteria are present in the liquid, imposes severe threats to public health by seeding the formation of biofilms, a major source of infections in hospitals. Moreover, the adsorption of matter from liquids onto the surface can change the surface chemistry and lead to a degradation of tailored surface properties, e.g. its superhydrophobicity. Only if direct contact of the liquid to the substrate is avoided, adsorption of contaminants to its surface can be prevented.

Figure 5A:
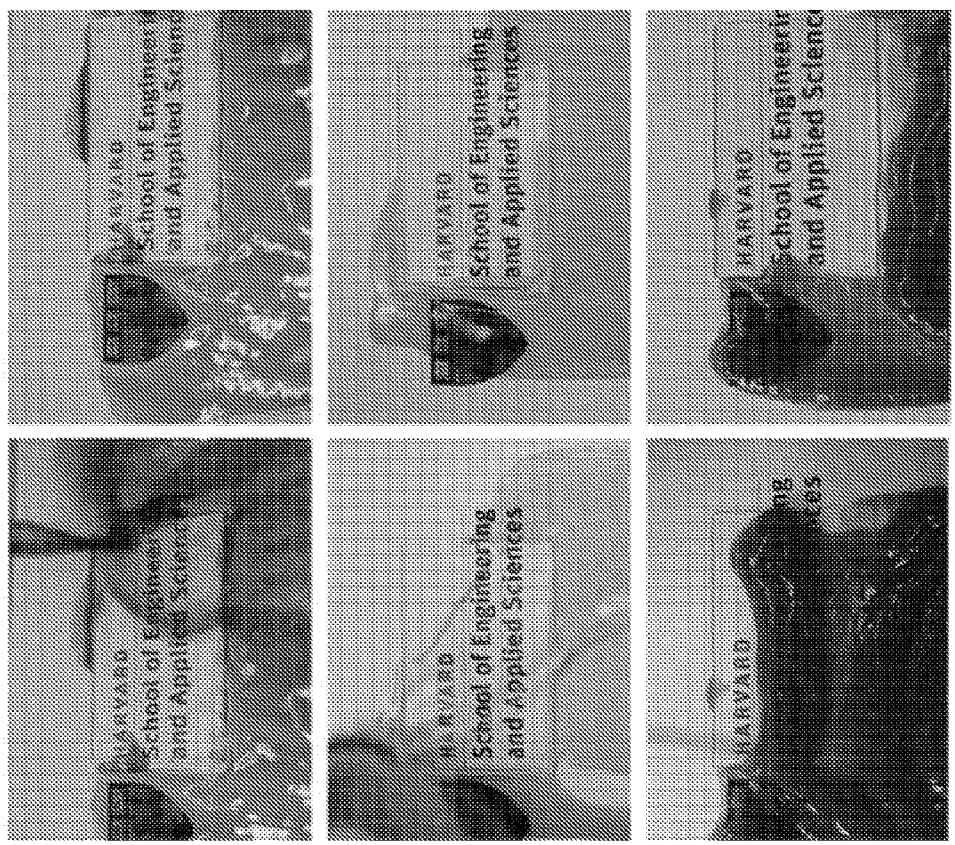
FIG. 5A shows the effective repellency and complete absence of staining of SLIPS-modified glass windows after spilling of red wine, olive oil, and ketchup in accordance with certain embodiments.

As shown in FIG. 5A, the effective repellency and complete absence of staining of SLIPS-modified glass windows after spilling of red wine (see top row), olive oil (see middle row) and ketchup (see bottom row) or equivalent complex fluids is also observed. On the right columns of FIG. 5A, the letters below the silica glass coated with the SLIPS structure is clearly visible for all three test materials, demonstrating its high transparency. The surfaces show similar repellency properties towards a wide range of possible contaminations. Water, octane, and blood have been tested and are strongly repelled by the SLIPS-modified glass windows. Other contaminants that can be repelled include, but are not limited to, various types of oil, cement, concrete, water-based chemical formulations including acids and bases, paints, bodily fluids, sewage, organic-liquid based contaminants as well as solvents; food such as mayonnaise, mustard, vinegar or any similar materials.

The strong adhesion of ice to most common surfaces, causing safety and economic issues in any technology subjected to sub-zero environments, is another example where the direct contact of the material with the substrate is the principal cause for its detrimental effects.

Figure 5B:
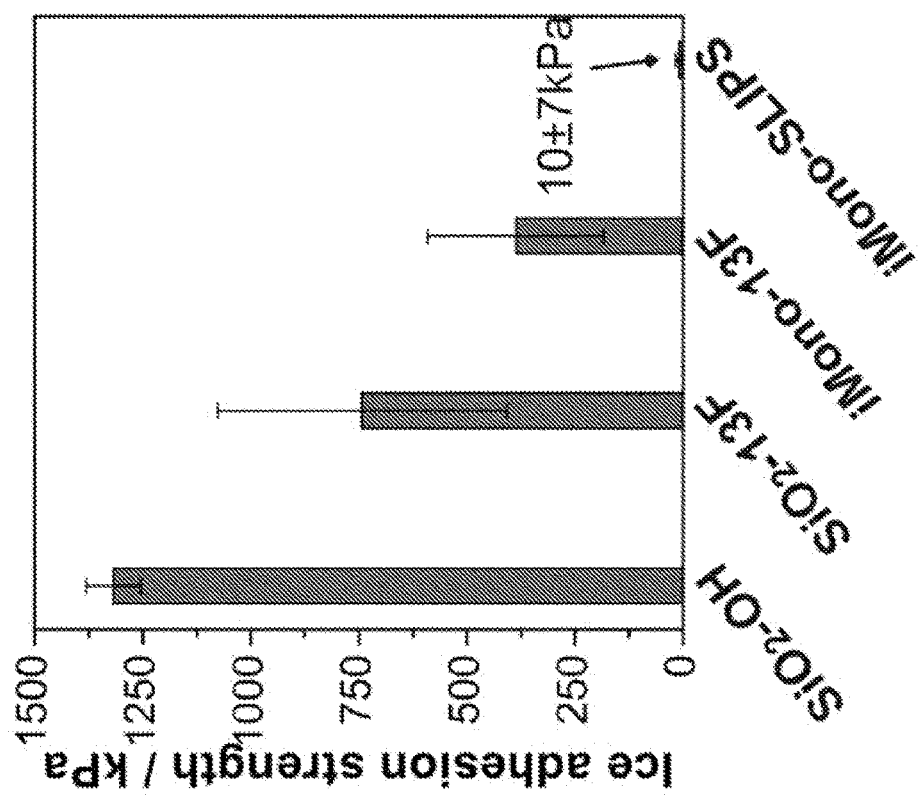
FIG. 5B compares the adhesion strength of ice (measured at −40° C. using a custom ice adhesion setup adapted from literature) for different glass substrates in accordance with certain embodiments.

FIG. 5B compares the adhesion strength of ice (measured at −40° C. using a custom ice adhesion setup adapted from literature) for different glass substrates. The strong adhesion of ice to hydrophilic glass (1318±63 kPa) drops with fluorination of the surface but is still substantial (743±334 kPa). The presence of a superhydrophobic, fluorinated inverse monolayer structure on the surface further decreases the ice adhesion strength (387±204 kPa). The addition of a lubricating liquid to form a SLIPS coating drastically reduces the adhesion of ice by more than one order of magnitude compared to the superhydrophobic substrate (by decoupling the ice formation from the solid substrate). The measured ice adhesion strength on the transparent SLIPS coating (10±7 kPa) is in excellent agreement with previous results on SLIPS coatings on aluminum, underlining that the surface properties are governed by the lubricating liquid layer and not the solid substrate itself. Importantly, the present disclosure provides an optically transparent, ice resistant SLIPS structure, which is desired in numerous applications.

Example 3

Improved Repellency after Evaporation of Lubricating Liquid

Figures 6A, 6B:
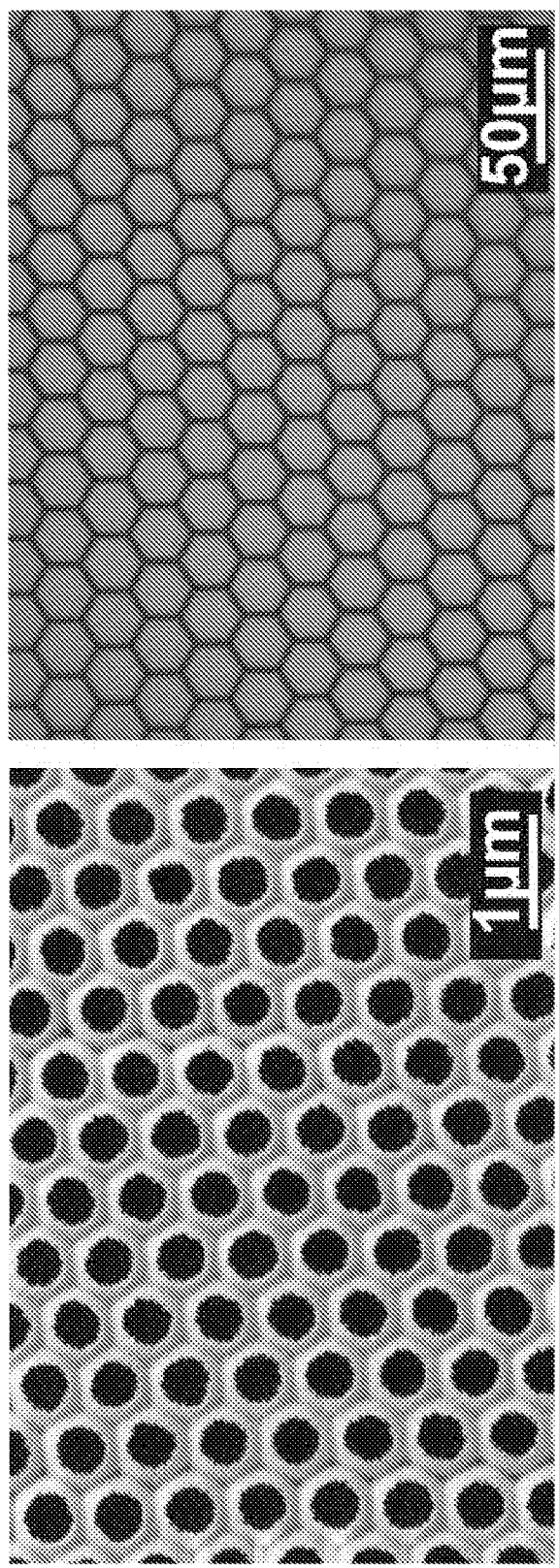
FIG. 6A shows a SEM image of a surface feature having re-entrant curvature in accordance with certain embodiments.
FIG. 6B shows a SEM image of honeycomb structure without any re-entrant curvature.

To demonstrate the improved repellency of the structures having surface features with re-entrant curvature, non-lubricated samples were tested and compared with other porous structures especially those that have similar geometry, but the absence of the re-entrant features (i.e., vertical wall honeycomb lattice). FIGS. 6A and 6B show the structures having surface features with re-entrant curvature (FIG. 6A) and structures having surface features without any re-entrant curvature (FIG. 6B). Surface features having re-entrant curvature were formed as described above in Example 1 and designed to have a pore opening angle of 45°. The honeycomb lattice shown in FIG. 6B has an opening pore angle of 90°.

Figure 6C:
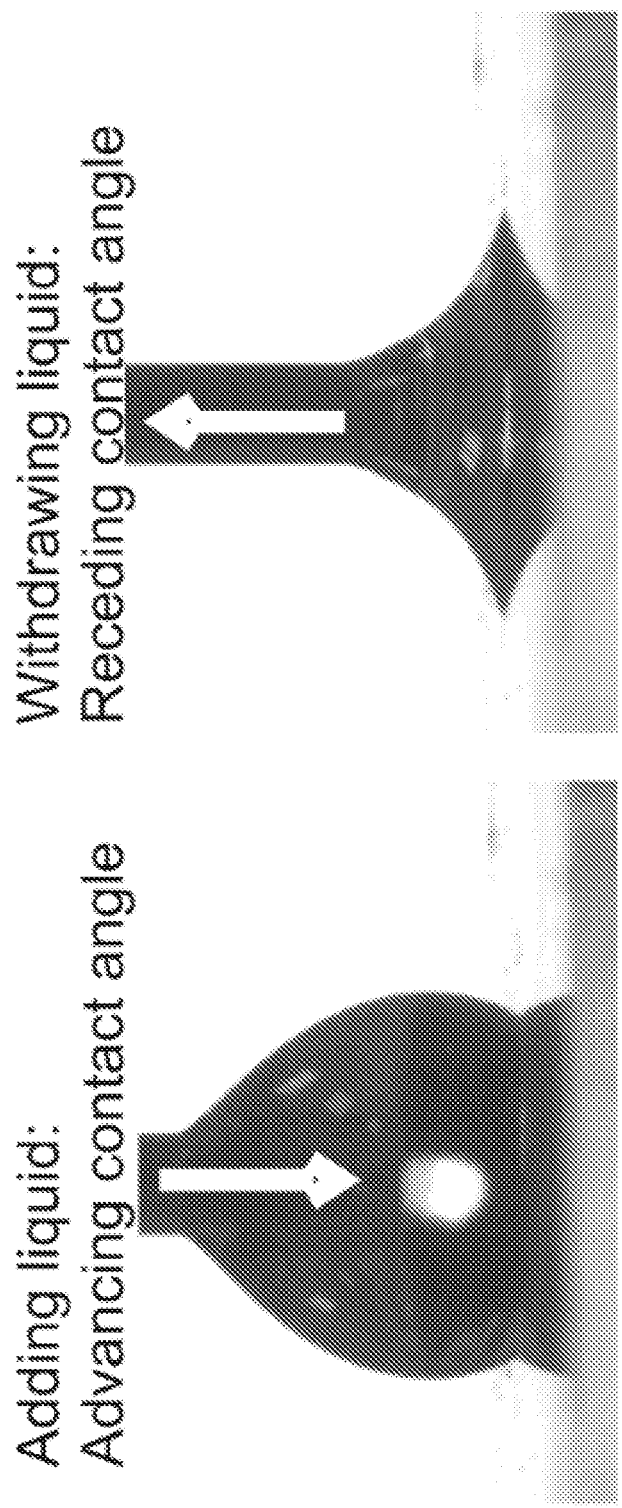
FIG. 6C defines advancing and receding contact angles as a liquid droplet is added or withdrawn, respectively, in accordance with certain embodiments.

Dynamic contact angles, that includes advancing and receding contact angles, were measured. As shown in FIG. 6C, advancing contact angle measures the contact angle that forms between the liquid and the substrate as the liquid is advanced toward the substrate. Receding contact angle measures the contact angle that forms when the liquid is receded from the substrate. Particularly, the receding contact angle reflects the amount of pinning on the substrate where small receding angles indicate a high degree of pinning of the test liquid to the underlying substrate.

Figure 6D:
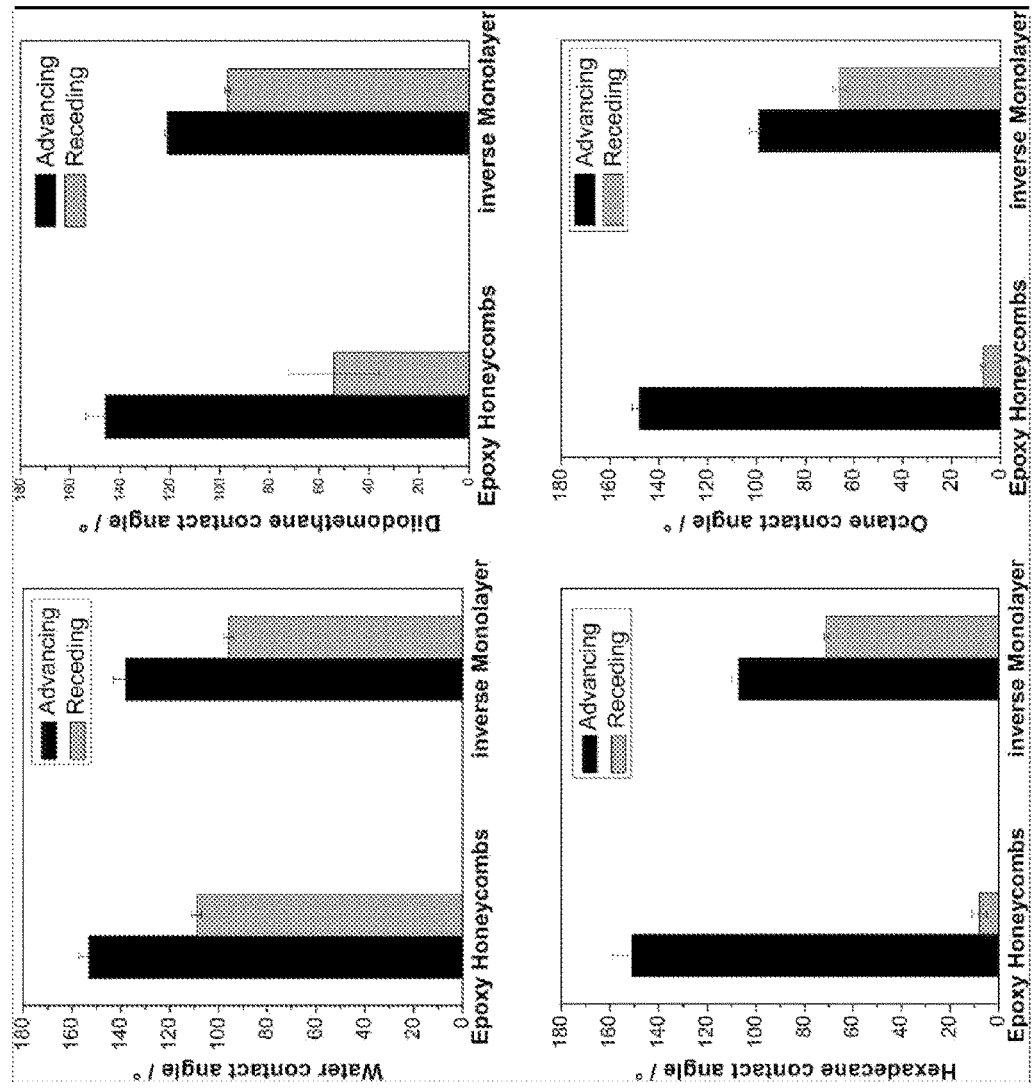
FIG. 6D compares the dynamic contact angles for inverse monolayers having re-entrant curvature and honeycomb lattice structures without re-entrant curvature in accordance with certain embodiments.

Four different liquids, having a different amount of surface tension were tested. Water (72.8 mN/m), diiodomethane (50·mN/m), hexadecane (27.5 mN/m), and octane (21.7 mN/m) were tested. All surface tension values are given for 20° C. temperature. As shown in FIG. 6D, while both the inverse monolayer structure having re-entrant curvature and the traditional honeycomb lattice without any re-entrant curvature provided high advancing angles for all liquids, there was a drastic decrease in the receding contact angles for the honeycomb lattice structure for liquids having small surface tension values. For example, hexadecane and octane are completely pinned over the honeycomb lattice structure while the inverse monolayer structure having re-entrant curvature was able to maintain its repellency.

Example 4

Reduced Shear Erosion

Many applications that involve the use of SLIPS involve environments where shear flow is involved and removal of the lubricating liquid with shear is problematic. For example, when the shear forces are sufficiently high, the lubricating liquid can be removed and expose the underlying porous substrate. As described above, conventional approach to obtaining highly repellent (non-SLIPS) surfaces included minimizing the contact points between the material to be repelled and the underlying substrate. Hence, posts and pillars were conventionally utilized. However, while the use of posts and pillars can be utilized as structures that may provide enhanced repellency after evaporation of the lubricating liquid in some cases, such structures suffer from other undesired characteristics, such as facile shear erosion.

Figure 7:
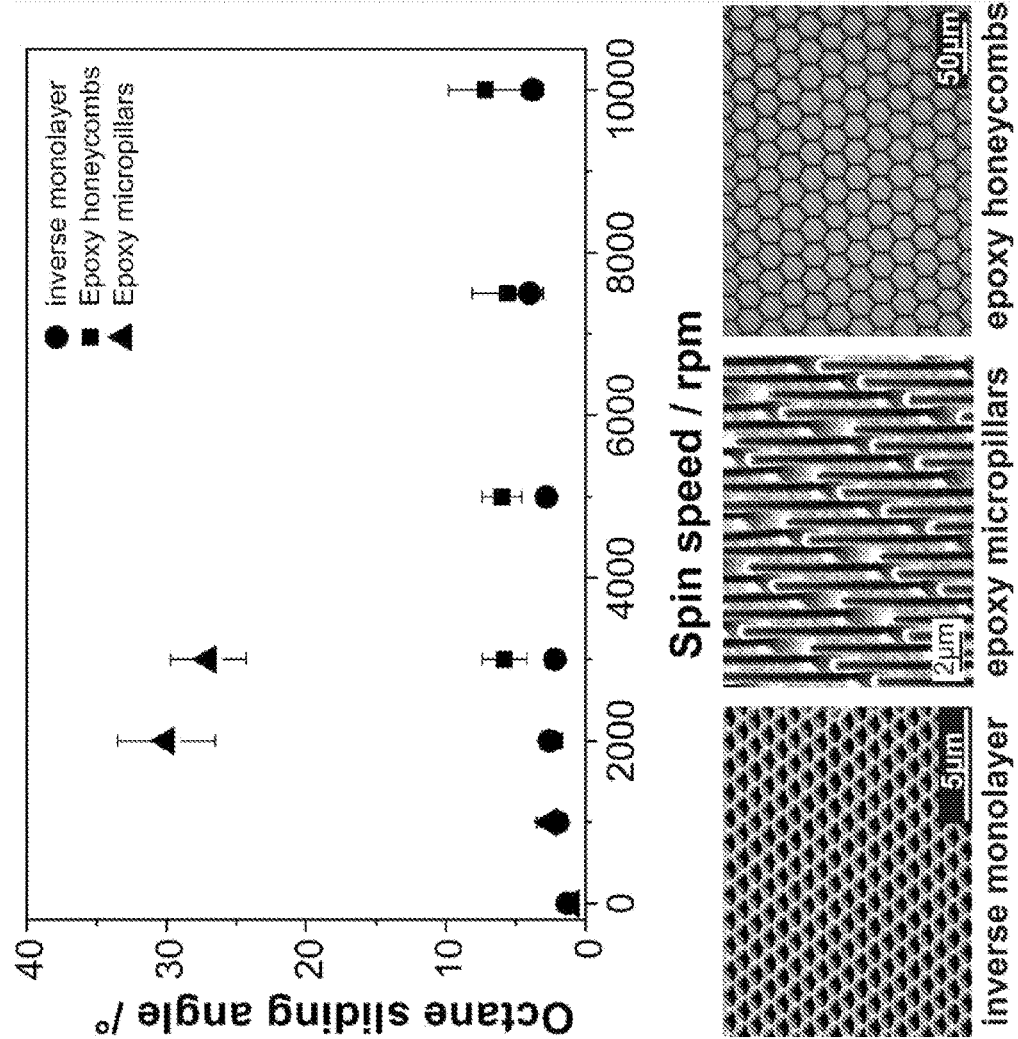
FIG. 7 compares the shear erosion resistance for inverse monolayers having re-entrant curvature, honeycomb lattice structures without re-entrant curvature, and micropillars without re-entrant curvature in accordance with certain embodiments.

To mimic shear erosion conditions, three different samples were subject to a increasing amounts of rotation, where higher spin speeds mimic higher amount of shear forces. The inverse monolayer having re-entrant curvature, epoxy micropillars, and epoxy honeycomb structures were tested using octane as the test liquid. As shown in FIG. 7, both the epoxy honeycombs and epoxy micropillars were able to maintain a low sliding angles (indicating the presence of SLIPS) even after 10000 rpm. However, the epoxy micropillars shows a noticeable increase in the sliding angle just after 2000 rpm.

Hence, this example demonstrates that the inverse monolayers having re-entrant curvature is able to withstand shear erosion much more effectively than the epoxy micropillars. Moreover, as the previous example demonstrated, despite the fact that epoxy honeycombs lattice structure may be able to withstand high shear erosion, after evaporation of the lubricating liquid, pinning of numerous different liquids may occur. Also, these substrates having the epoxy honeycomb lattice structure are not transparent.

Accordingly, these examples demonstrate that SLIPS structures formed with surface features having re-entrant curvature provide better resistance to removal of the lubricating liquid through shear erosion and better repellency even after evaporation/removal of the lubricating liquid.

Example 5

Control of Opening Pore Angle

Figure 8A:
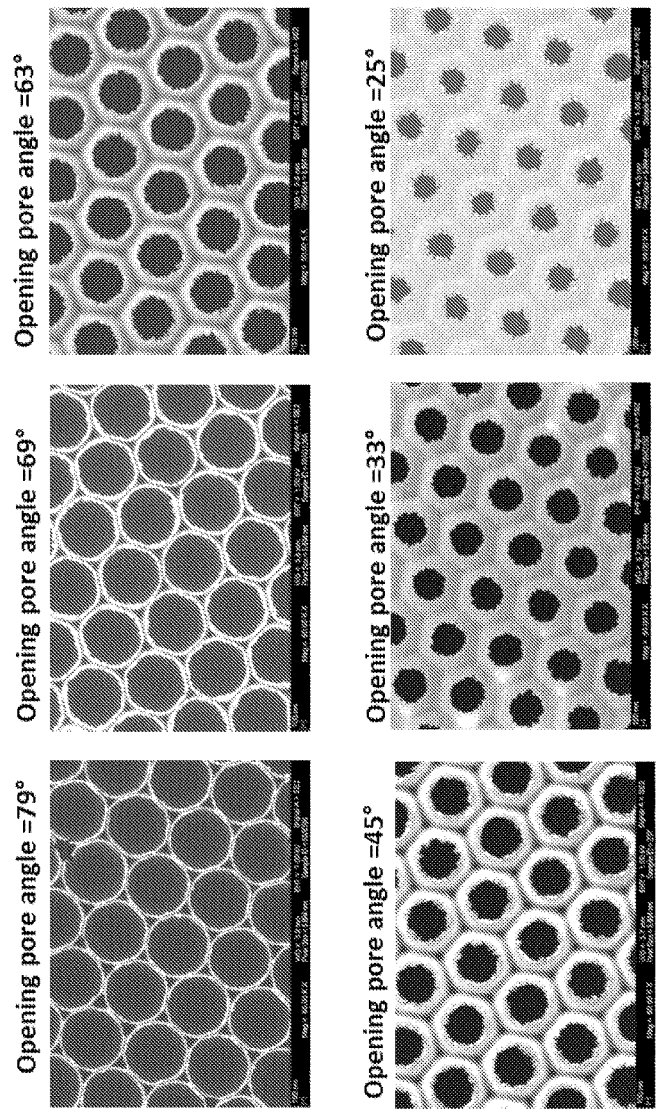
FIG. 8A shows SEM images of surface features having a different degree of re-entrant curvature in accordance with certain embodiments.
Figure 8B:
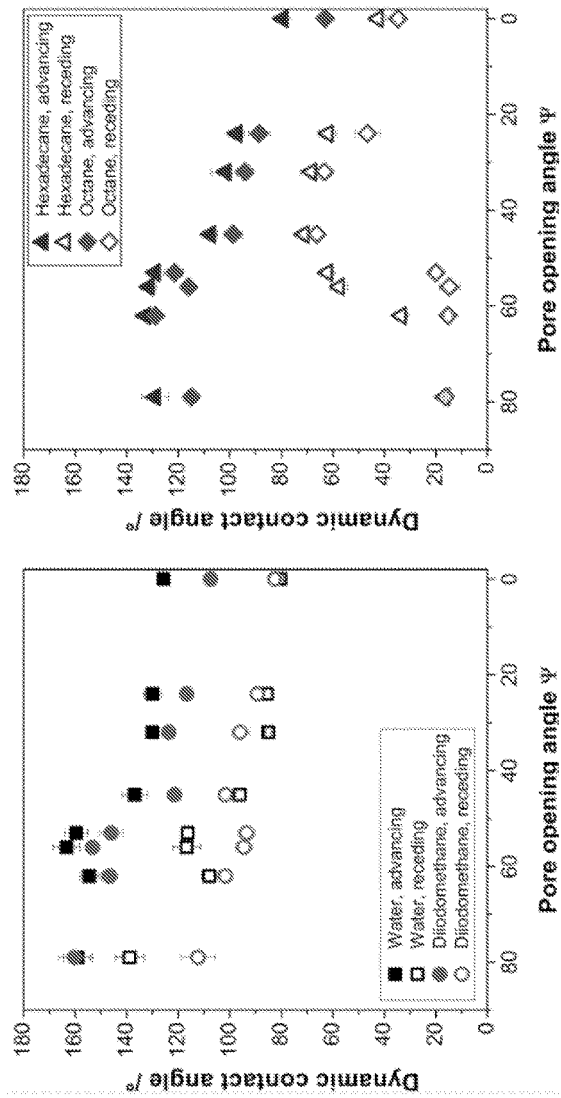
FIG. 8B compares the dynamic contact angles for various different inverse monolayers having a different degree of re-entrant curvature in accordance with certain embodiments.

Additional samples were prepared as described in Example 1, except the amount of TEOS was altered to obtain different opening pore angles. FIG. 8A shows some exemplary structures having different opening pore angles. By changing the opening pore angles, the dynamic contact angles for the same liquid can be altered. For example, FIG. 8B shows the dynamic contact angles for water and octane based on the different opening pore angles. As shown, octane can be either repelled (e.g., at pore opening angle of about 45°) or pinned (e.g., at pore opening angle of about 80°) depending on the pore opening angle, providing great versatility for designing a system of interest.

Example 6

Optical Properties

Figure 9A:
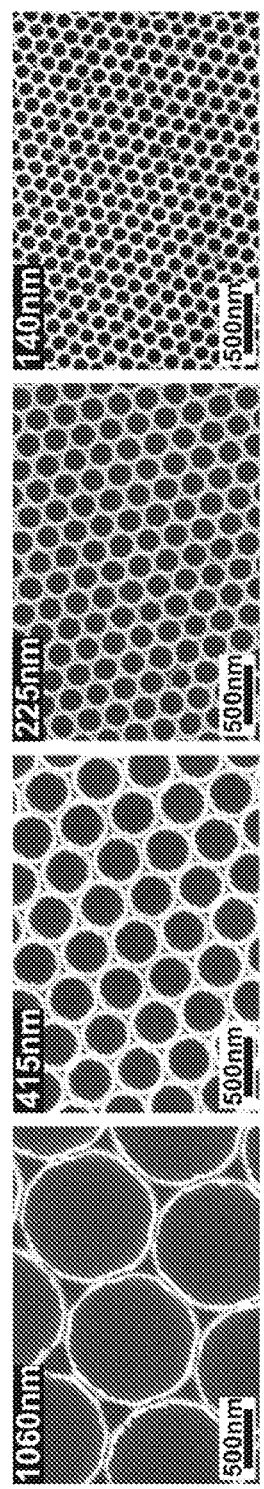
FIG. 9A shows SEM images of the inverse monolayer structures prepared from colloids with sizes as specified in the insets, in accordance with certain embodiments.

As shown in FIG. 9A, the pore size of the inverse monolayers was adjusted from 140 to 1060 nm by changing the colloid size while maintaining close-packed order and regularity. Downscaling the structure sizes has strong effects on the optical properties.

Figure 9B:
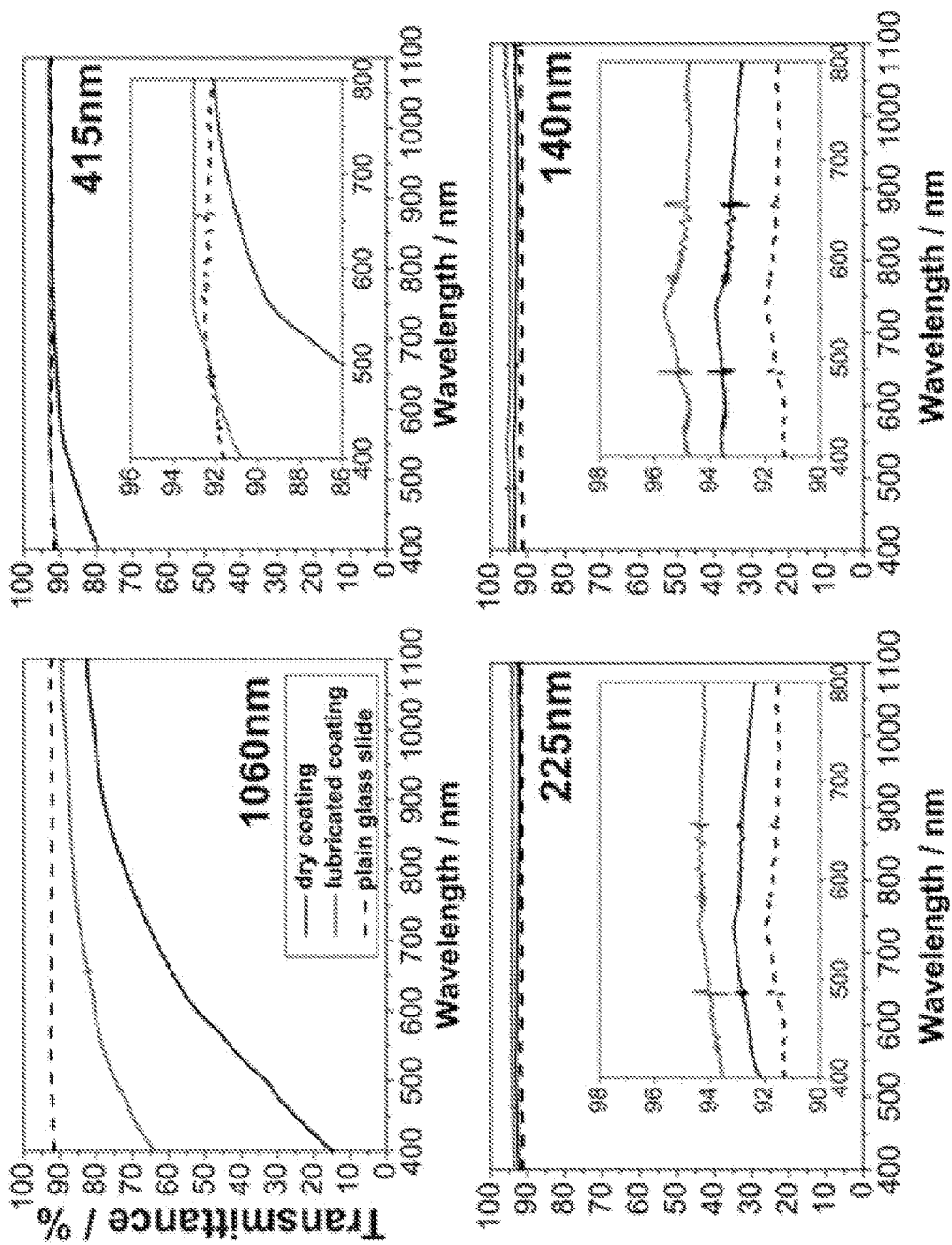
FIG. 9B shows the transmittance measurement results for various different surfaces formed in accordance with certain embodiments.
Figure 9C:
FIG. 9C shows optical transparency between non-SLIPS and SLIPS surfaces in accordance with certain embodiments.

FIG. 9B compares UV-Vis-NIR transmission spectra of the differently sized inverse monolayers deposited on one side of microscope slides at normal incidence in dry coating and lubricated coatings to untreated glass slides. The large colloids (1060 nm) show a strong coloration arising from Mie resonances of the individual structures and diffractively coupled resonances of the ordered structures. With decreasing feature size, light losses are strongly diminished and the substrate's transparency is identical to a plain glass slide used as a control. As shown in FIGS. 9B and 9C, the addition of the lubricating liquid decreases the refractive index contrast, leading to a drastic reduction in light losses. From a colloid template size of 415 nm, no loss of transmitted light intensity is detected and the substrates appear as transparent as regular glass slides. For colloid template sizes of 225 nm and 138 nm, the SLIPS coating leads to enhanced light transmission of up to 3%. Without wishing to be bound by theory, the enhanced transparency may be attributed to the reduced refractive index contrast of the lubricating liquid/air interface compared to the original glass/air interface; and the enhanced transparency achieved with 225 and 140 nm colloids compared to the control glass substrate can be attributed to the emergent antireflective properties of the surface.

Example 7

Increased Stability from Loss of Fluids Through Evaporation or Gravity

Figure 10:
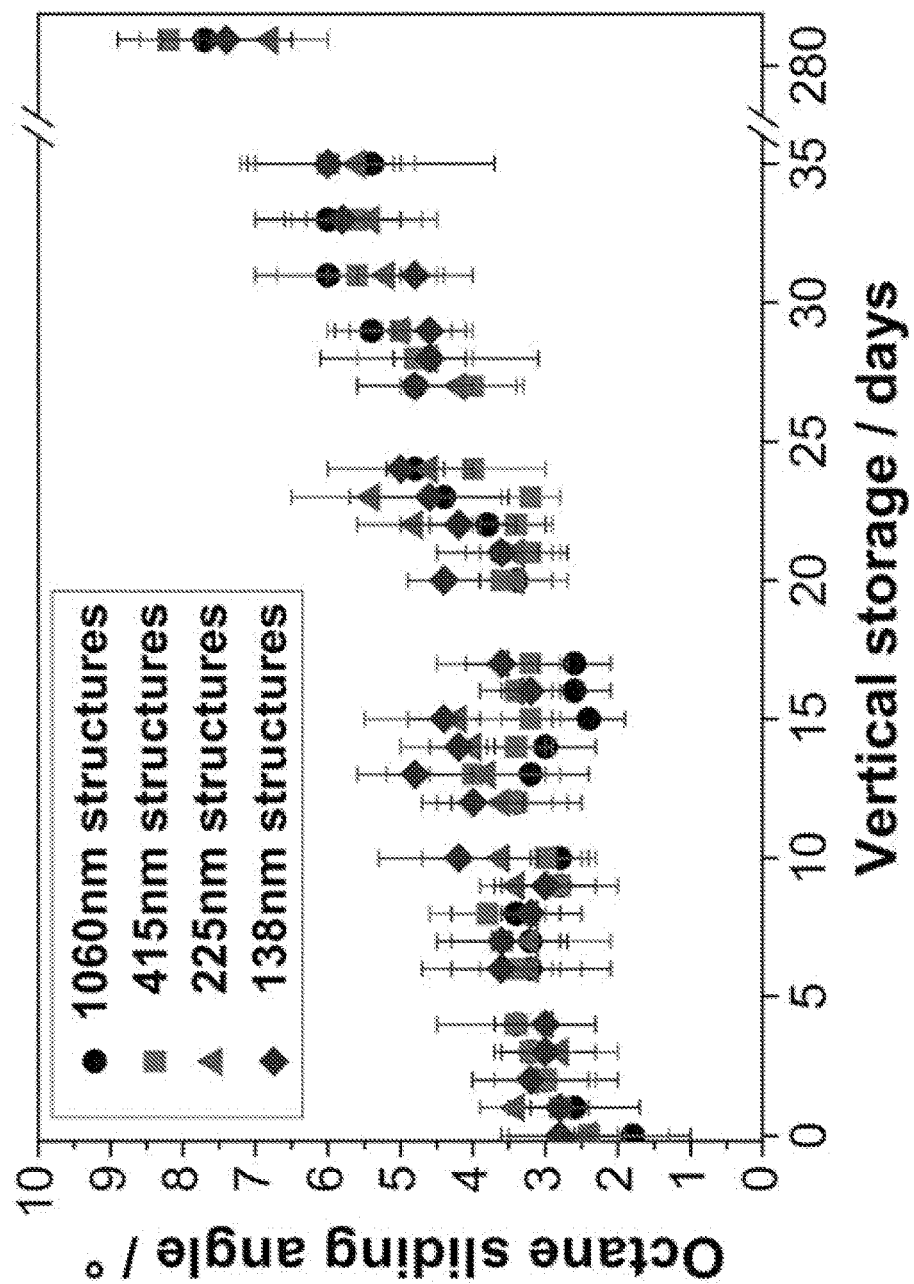
FIG. 10 show the octane sliding angle after vertical storage demonstrating the stable nature of the SLIPS surface formed in accordance with certain embodiments.
Figures 11A, 11B, 11C, 11D:
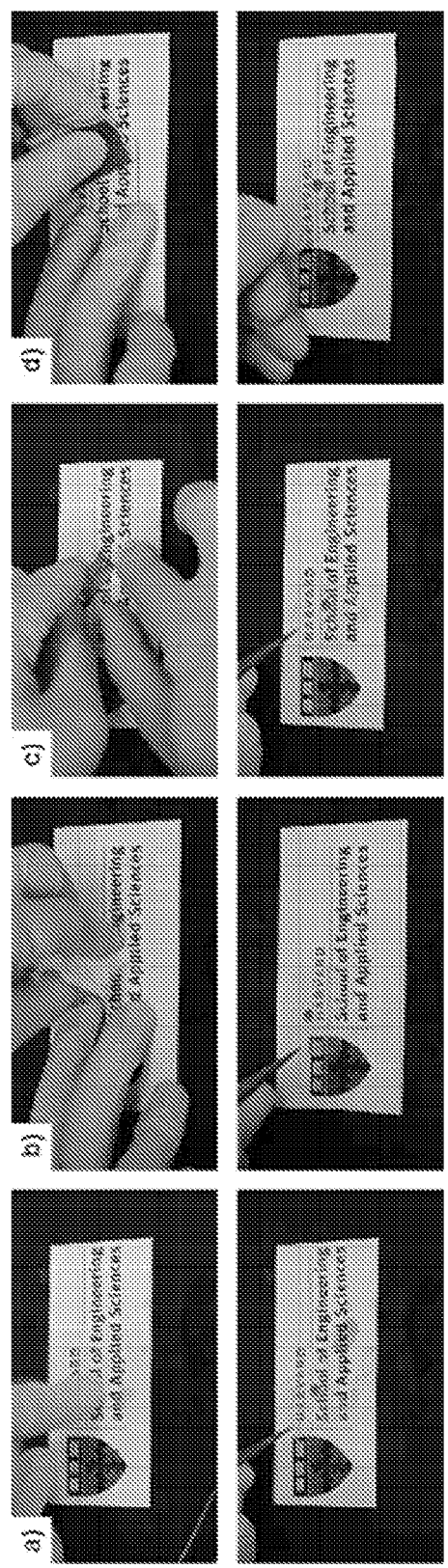
FIGS. 11A-11D show optical image of the mechanical robustness of the SLIPS surfaces formed in accordance with certain embodiments.

The re-entrant coatings create nearly enclosed compartments for the lubricating liquid, and therefore maintain their repellency over an extended period of time, which was confirmed by a long-term measurement of octane repellency on vertically stored substrates, mimicking an actual window. As shown in FIG. 10, even after more than 9 months of vertical storage without replenishment of lubricating liquid, all samples continue to show octane sliding angles well below 10°.

Example 8

Increased Tolerance to Mechanical Damage

The structures described herein can tolerate significant mechanical damage and self-heal as the lubricating liquid wicks into damaged parts of the sample. This self-healing mechanism is caused by the liquid nature of the lubricating liquid and is unique to liquid-infused substrates and not found in conventional repellent coatings. FIGS. 11A to 11D presents still frames taken from a recorded movie demonstrating surfaces maintaining their high repellency after mechanical damage. As shown, the SLIPS state is maintained after touching (see FIG. 11A), wiping with a tissue paper (see FIG. 11B), cutting with a razor blade (see FIG. 11C) and even after sandpaper treatment (see FIG. 11D)). The retained repellent properties are visible as a stained octane droplet retains its spherical shape and does not stain the surface, indicating that it does not get in contact and pinned to the substrate.

Example 9

Versatile Fabrication Over any Desired Substrate

Figure 12:
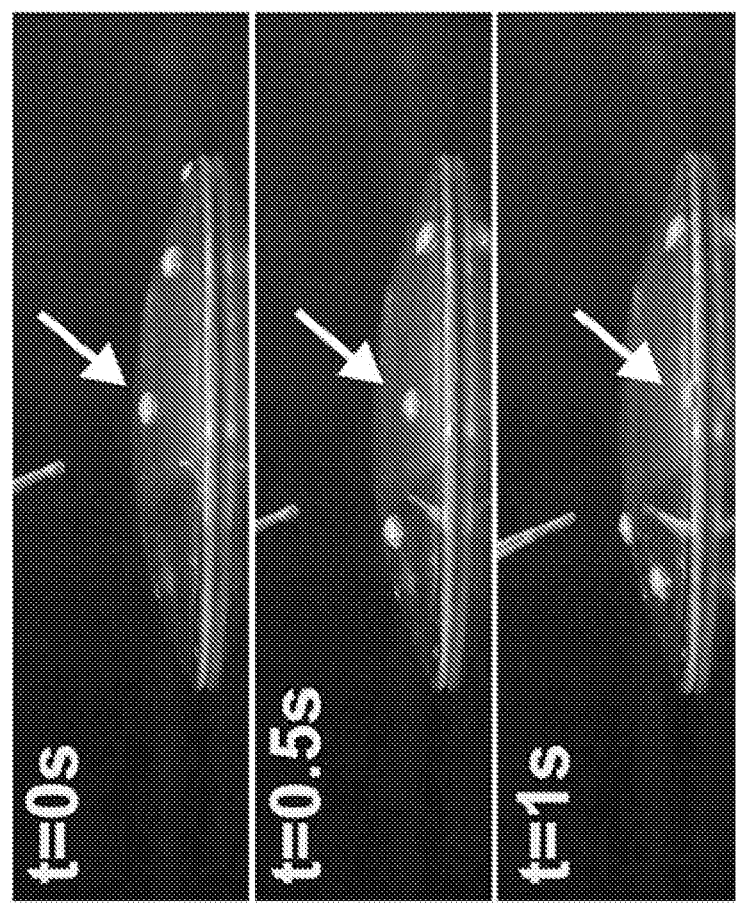
FIG. 12 shows images of SLIPS surface formed over curved lens in accordance with certain embodiments.

To fully exploit the transparency of the coating in real life applications, the ability to coat substrates with curvatures is of great importance. FIG. 12 shows time-lapsed images of a watch glass covered with an inverse monolayer-based SLIPS coating that repels stained octane droplets. Likewise, the curved surface of a glass vial was rendered slippery and showed perfect non-wetting behavior when immersed in stained octane or water solutions (not shown). This demonstrates the feasibility of producing transparent self-cleaning curved substrates, and significantly increases the versatility of the disclosure provided herein for various applications. The possibility to introduce transparent SLIPS coatings to curved or topographically structured objects is of technological interest, especially for the creation of non-fouling, self-cleaning, self-healing lenses for technological and medical applications (eg cameras, endoscopes, etc), protective covers (e.g. for flashlights, lamps or carlights), glasses, face shields or glass-domes, solar cells, windows and ceilings in architecture.

Example 10

Patterned Wetting Properties

The uniformity and low height of the surface structures enables the application of conventional photolithographic processes to prepare locally confined patterned SLIPS regions (see FIG. 3B). The process is based on the creation of surface functionality patterns. The lubricating liquid is only locked-in firmly in areas with matching surface chemistry, while it will be replaced by a second liquid in areas with different surface chemistry. However, due to its low surface energy, addition of the lubricating liquid leads to a homogeneous lubricating liquid film covering the entire coating. Upon the addition of a second liquid, a metastable state can be created in which the lubricating liquid layer is not immediately disrupted by the liquid (see state 6 in FIG. 3B). Eventually, the energetically most favorable state is reached as the liquid displaces the lubricating liquid layer in non-functionalized surface regions. Stable SLIPS surface regions defined by the fluorinated surface chemistry remain wetted by the lubricating liquid only without being displaced by the applied test liquid to be repelled.

A conventional photoresist (S1818, positive tone resist) is spincoated (4000 rpm, 60 s) on the unsilanized inverse monolayer substrate. Illumination with UV light following the recipe of the photoresist manufacturer (Shipley Company, Marlborough, Mass.) with a irradiation dose of 200 mJ/cm2 followed by development of the structures (Developer MF319, 60 s). The substrate, consisting of areas covered by photoresist and free areas is plasma treated for 5 min and then fluorosilanized similar to non-patterned substrates. After silanization, the resist is washed off the substrate (Remover PG 1165). Application of the lubricating liquid then produces patterned SLIPS surfaces as the conditions for stable SLIPS state is only fulfilled in the fluorosilane-functionalized surface regions.

Figures 13A, 13B, 13C:
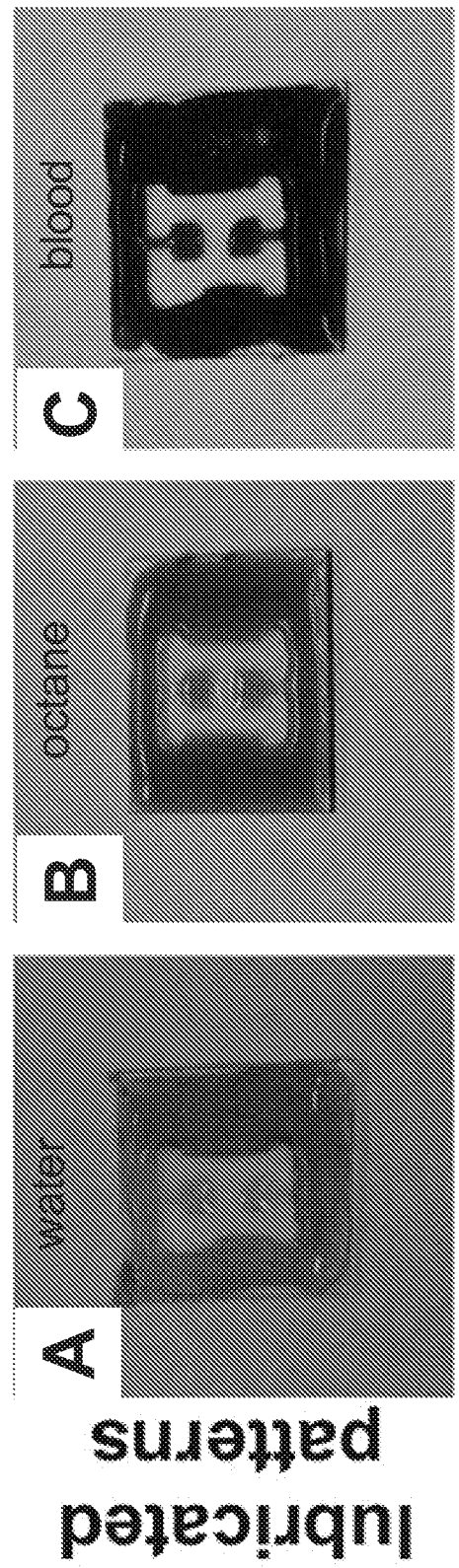
FIGS. 13A-13C show some exemplary confinements of liquids created from patterned surface chemistries formed in accordance with certain embodiments.

The superior performance of the SLIPS-based approach to create patterns of liquids on solid substrates is shown in FIGS. 13A-13C. As shown, several test liquids are successfully confined to designated surface regions based on matching surface chemistry.

Potential applications of patterned SLIPS substrates can include, among others, the control of fluid flow simply by wetting contrast without the need of solid confinements and the controlled placement of target structures from solution to specific places on a substrate (defined by non-slippery regions) without the risk of cross-contamination.

Example 11

Surface Structure Design and Liquid Repellency

Figure 14:
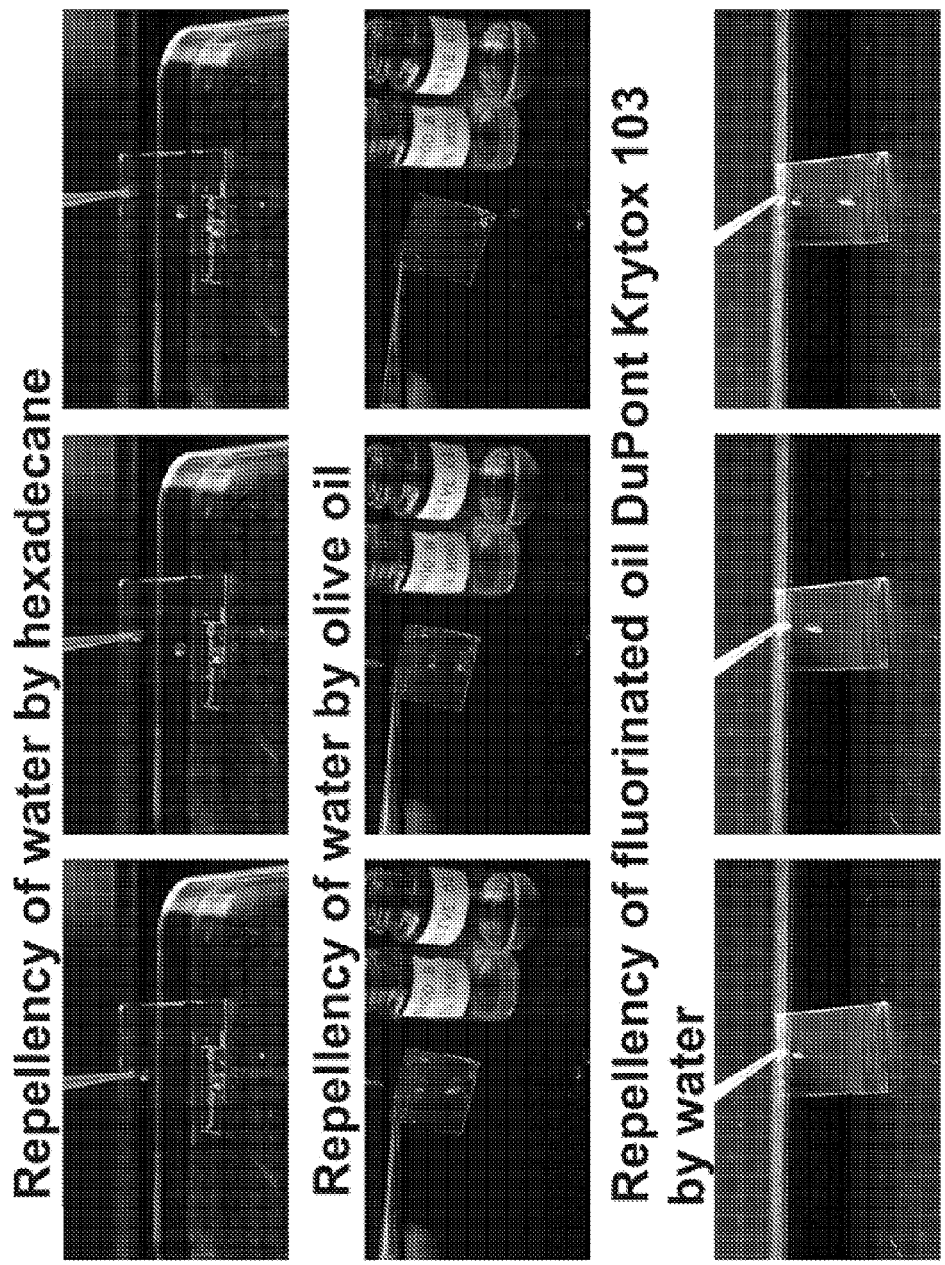
FIG. 14 shows images of the repellency of different repellent materials over SLIPS surfaces formed in accordance with certain embodiments.

It is noteworthy that the repellent properties of these surfaces are not limited to the use of fluorinated liquids as lubricating liquids: with a proper adjustment of the surface chemistry a variety of different fluids can be used as lubricating liquids to repel a second, immiscible liquid. For example, water-repellent properties of hexadecane- and olive oil-infused coatings functionalized with hydrophobic decyltrichlorosilane molecules or, more remarkably, the repellency of the fluorinated oil itself by water-infused hydrophilic inverse monolayer are possible as shown in FIG. 14.

Example 12

Assessment of Thermodynamic Stability

Compared to existing approaches to create nanoscale surface patterns, the design of SLIPS coating based on a simple, bottom-up self-assembly process of colloids exhibits surface structures with finely controlled feature sizes, high regularity and uniformity. This allows analysis and comparison of the stability of the transparent SLIPS coatings with theoretical predictions based on thermodynamic considerations.

The minimum surface roughness R—defined as the ratio of the surface area of the porous substrate to that of a flat surface—required to support a stable SLIPS condition can be calculated based on the surface energy balance concept. The stability of a system with a droplet of repellent liquid A (contact angle $\theta_A$, surface tension $\gamma_A$) sitting on top of a film of lubricating liquid B ($\theta_B$, $\gamma_B$; interfacial tension of the two liquids $\gamma_{AB}$) is predicted by:

$$R > \frac{\gamma_{AB}}{(\gamma_B \cos\theta_B - \gamma_A \cos\theta_A)} \quad (1)$$

and $$R > \frac{\gamma_B - \gamma_A}{(\gamma_B \cos\theta_B - \gamma_A \cos\theta_A)} \quad (2)$$

For octane as the repellent material (Liquid A) and DuPont Krytox100 as the lubricating liquid (Liquid B), the following measured values were used:

$\theta_A = 55.0 \pm 1.20$ (contact angle of octane on a flat, fluorosilanized silicon wafer)

$\theta_B = 26.1 \pm 1.3°$ (contact angle of Krystox 100 on a flat, fluorosilanized silicon wafer)

$\gamma_A = 21.7$ mM/m $\gamma_B = 17.1$ mN/m $\gamma_{AB} = 4.4$ mN/m

Equation 2 is generally fulfilled for the structures described herein as $\gamma_B < \gamma_A$ and therefore R>0. Therefore, equation (1) must be applied to determine the minimum roughness necessary to create a stable coating.

Hence, R>1.51±0.1 is obtained as the threshold value to support stable SLIPS.

Figure 15:
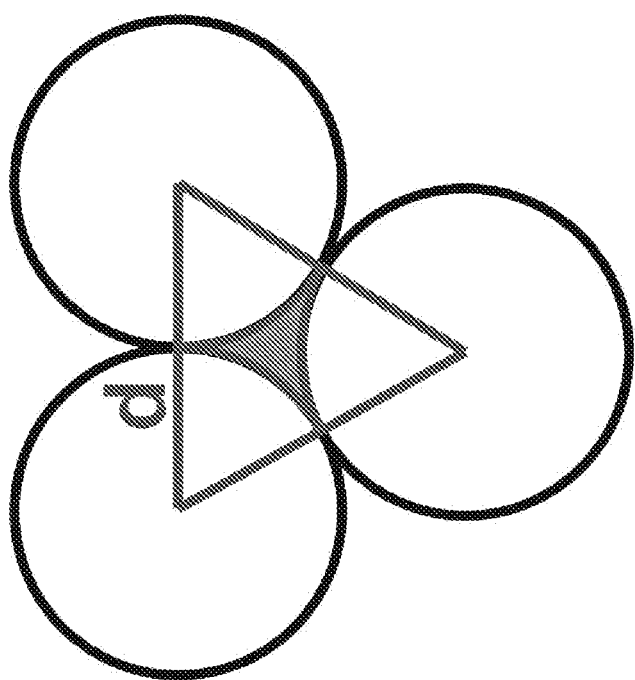
FIG. 15 shows a schematic illustration of the closed cell structure formed from a colloid coating in accordance with certain embodiments.

The roughness of the inverse monolayer substrate can be determined with ease due to the well-defined nature of the porosity. The roughness for an idealized inverse monolayer structure can be calculated geometrically using the relevant parameters illustrated in FIG. 15 and using the following approximations.

Firstly, the inverse monolayer is assumed to be an exact half-filled replication of the colloidal monolayer and its height therefore equals the colloids' radius. In real samples, the TEOS backfilling can be slightly higher than the colloids equator to obtain the re-entrant curvature.

Secondly, the central, triangular post and the bridges spanning to the next posts are assumed to be flat. In real samples, the post can have a concave curvature.

Thirdly, all surfaces are assumed to be ideally smooth. All assumptions lead to an underestimation of the actual roughness in the sample. Therefore, the roughness calculated here represents the minimum roughness value for a defect-free inverse monolayer structure.

The roughness is thus calculated as the surface area $A_{iMono}$ of an idealized inverse monolayer divided by the area of the triangular unit cell $A_{unit}$. The inverse monolayer surface is composed of the bowl-shaped pores created by the colloid templates (in the unit cell, this amounts to ¼ of a full sphere) plus the additional contribution of the triangular-shaped top part that bridges to the neighboring cells (indicated in the shaded region in FIG. 15).

$$R = \frac{A_{iMono}}{A_{unit}} = \frac{\left(\frac{1}{4}d^2\pi\right) + \frac{1}{4}d^2\left(\sqrt{3} - \frac{\pi}{2}\right)}{\frac{1}{4}d^2\sqrt{3}} = \frac{\frac{\pi}{2} + \sqrt{3}}{\sqrt{3}} = 1.91$$

Hence, a geometric analysis of the inverse monolayer structure estimates the roughness factor to be 1.91, which is significantly higher than the R>1.51 needed for the SLIPS system to be thermodynamically stable. Therefore, a uniform inverse colloidal monolayer is indeed capable of supporting a thermodynamically stable configuration. Additionally, it is worth noting that the SLIPS stability, as predicted by the equation, is not a function of the actual structure size, thus providing the thermodynamic foundation for the design of completely transparent coatings based on increasingly small feature sizes.

Example 13

Assessment of Defect Tolerance and Temporal Stability

Figure 16B:
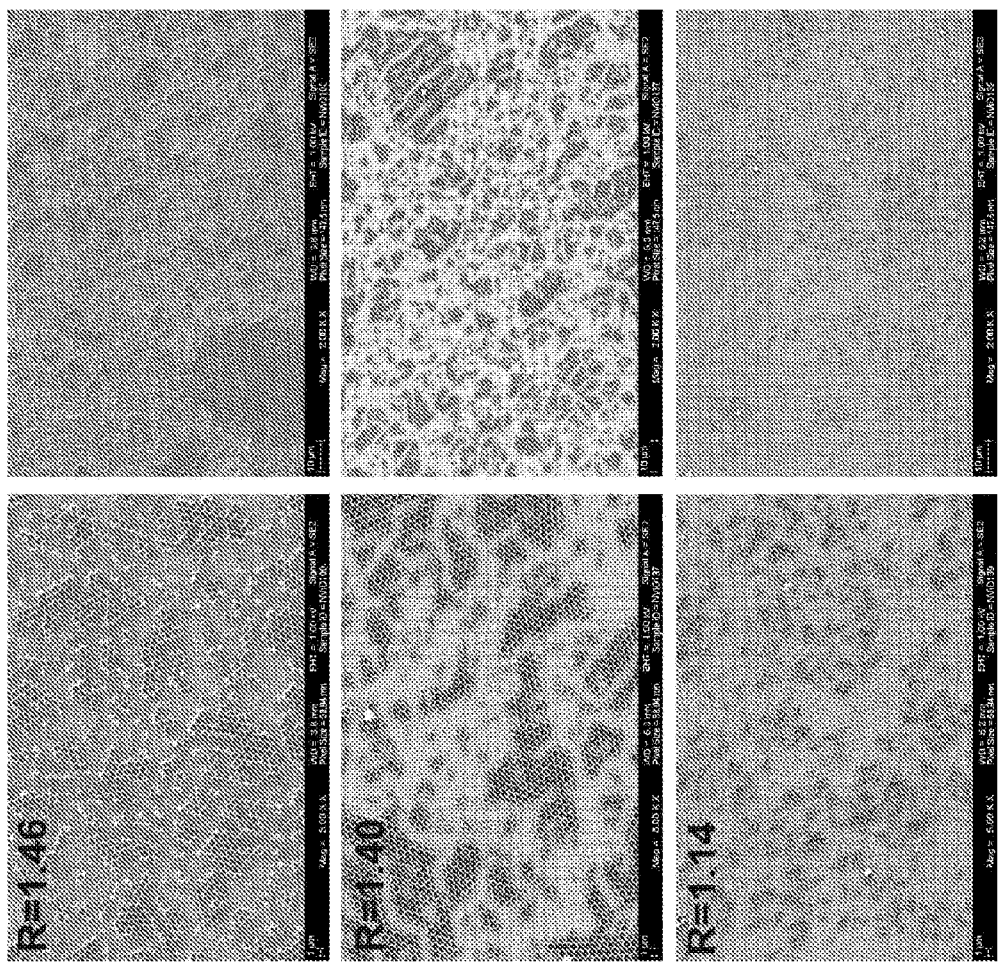
Figure 16C:
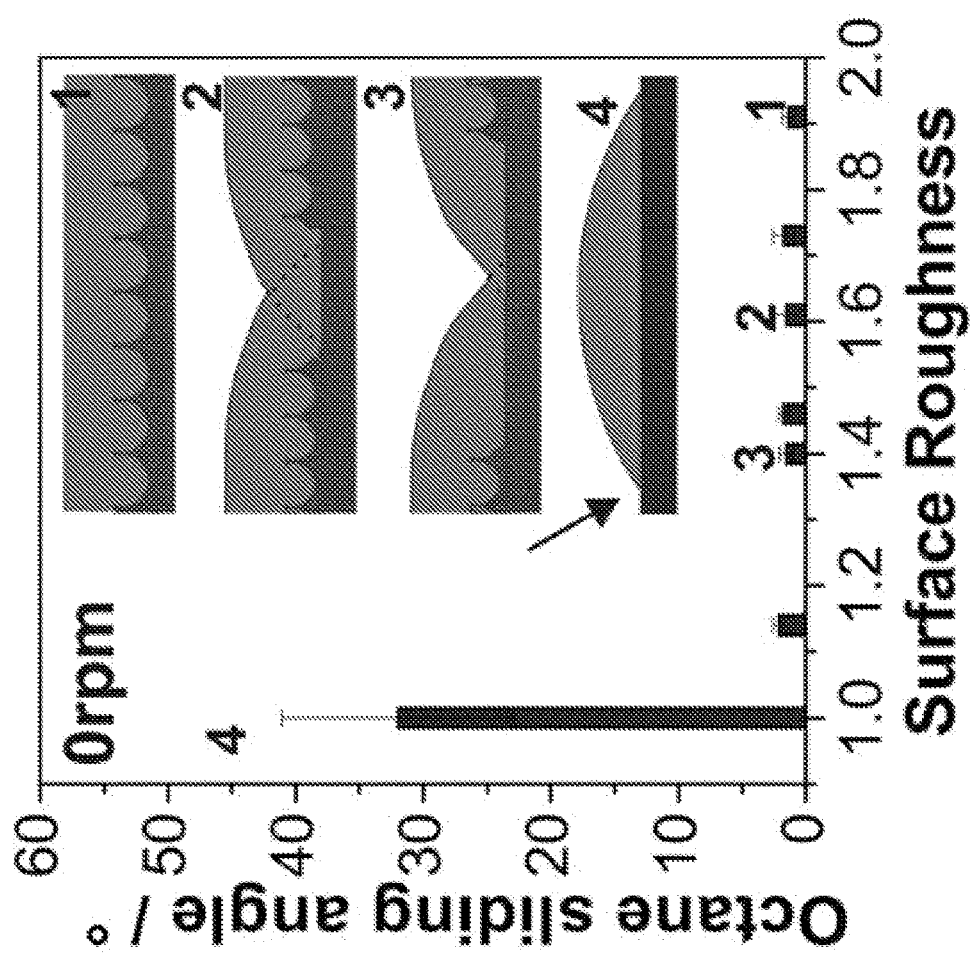
FIG. 16C shows the sliding angle of octane based on different surface roughness/defect distribution in accordance with certain embodiments.

In real applications, it is critical to understand what the defect tolerance and the associated thermodynamic penalties of imperfect or damaged SLIPS coatings are. The inverse monolayer substrates provide a great system to assess these parameters. By varying the amount of TEOS used for the inverse monolayer preparation, it is possible to tune the surface coverage of the nanostructures from an intact inverse monolayer to highly damaged surfaces featuring only small monolayer patches. As shown in FIGS. 16A to 16B, by reducing the amount of TEOS used, roughness ranging from 1.91 down to 1.14 (1.0 describes a plain surface without roughness) can be obtained. The length scale of the defects on the substrates is in the order of few micrometers and, hence, small compared to the dimension of a macroscopic liquid droplet. Thus, the droplet experiences a total roughness that is averaged from intact inverse monolayer and monolayer-free areas. After fluorosilanization and addition of a lubricating liquid, their performance in repelling octane was investigated as shown in FIG. 16C. All structured samples show effective octane repellency, as indicated by very small sliding angles (<5°). Comparing the roughness values in the experiment with the calculated minimum surface roughness, it was observed that the more damaged samples support a metastable SLIPS coating that, even though not in its thermodynamically stable state, sustain their repellent character, at least over the time frame of the experiment and in the absence of any external stresses.

A placement of an octane droplet onto the substrates over a longer time (>15 min) revealed pinning for the most damaged sample (R=1.14) while all other substrates remained repellent, corroborating metastability of the coating in short-term applications. It should further be noted that while the thermodynamic calculations are derived from the three-phase substrate/lubricating liquid/repellent liquid system. However, a more fundamental requirement for SLIPS is the ability of the lubricating liquid to wet the surface homogeneously (i.e. apparent contact angle θ*=0°). Using Wenzel's relation (cos θ*=R cos θ) we calculate the minimum roughness needed for complete wetting to be 1.11 ($θ_{Krytox}$=26.1°). Thus, the unexpected repellent behavior of highly damaged samples may be attributed to their ability to support homogeneous wetting of the lubricating liquid, the replacement of which by the probe liquid is slow compared to the experimental time frame. By virtue of the same argument, the flat sample fails to support high repellency because it is not completely wetted by lubricating liquid and thus exposes dry, de-wetted areas to which the octane droplet adheres (see FIG. 16C for a schematic illustration).

Example 14

Reduced Shear Erosion

Figure 17A:
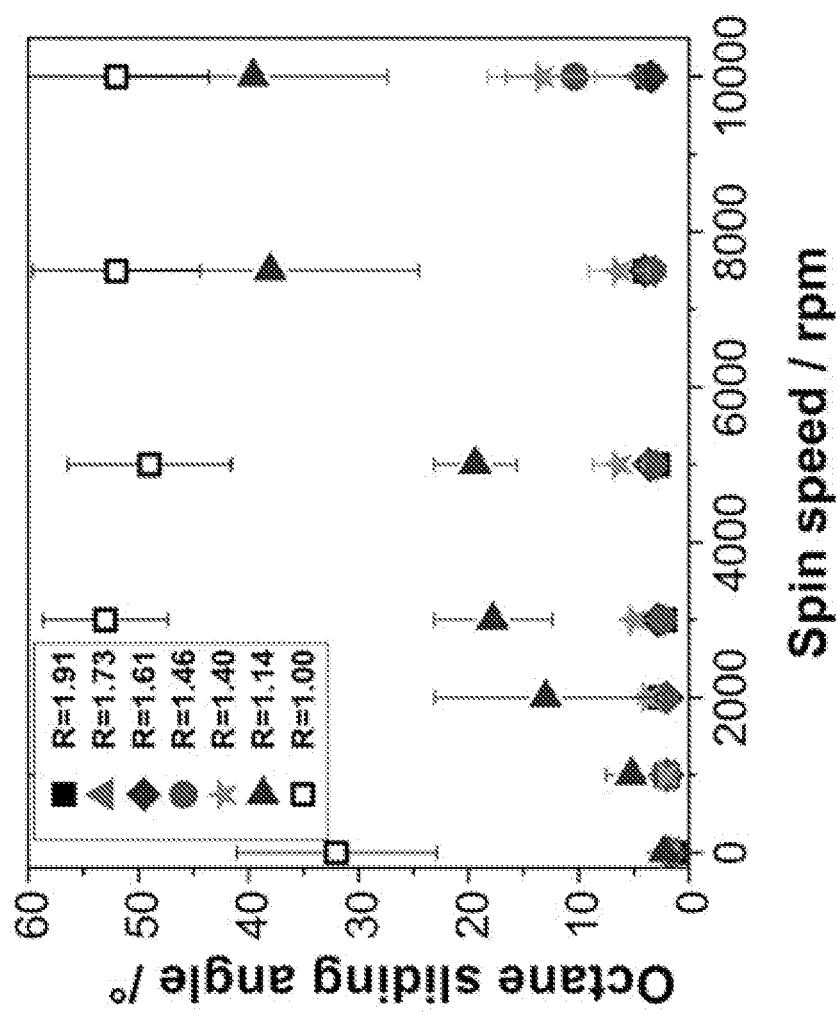
FIGS. 17A and 17B show the sliding angle of octane for different shear forces based on different surface roughness in accordance with certain embodiments.
Figure 17B:
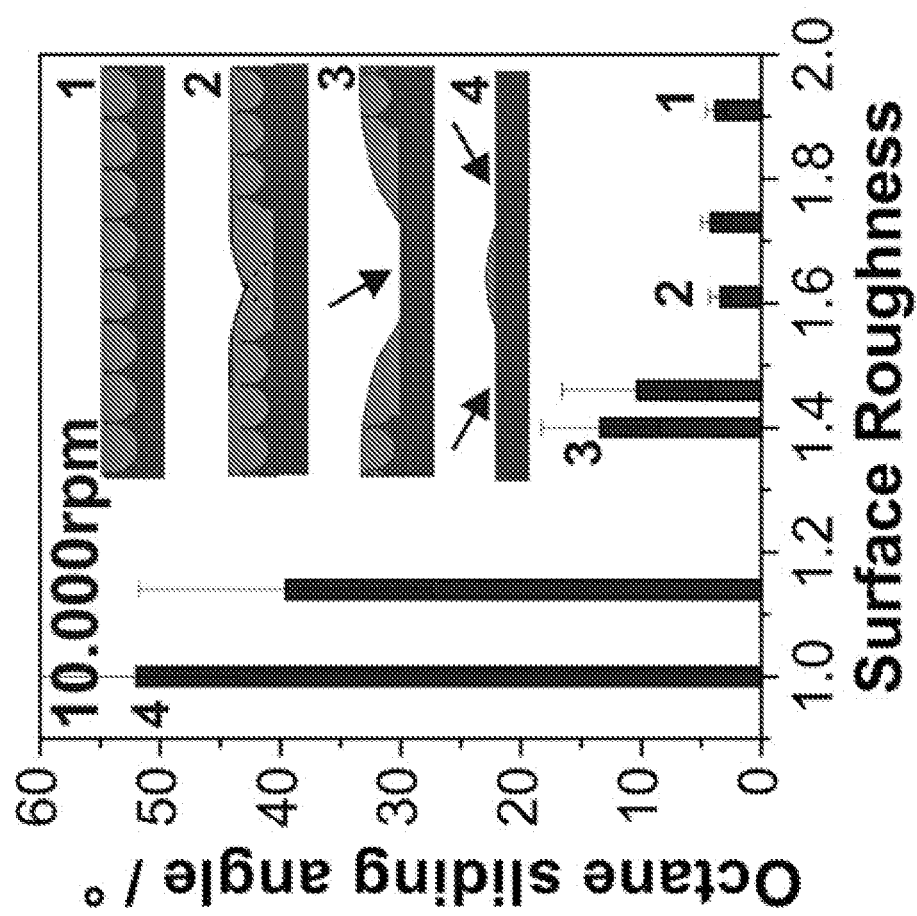
Figure 17C:
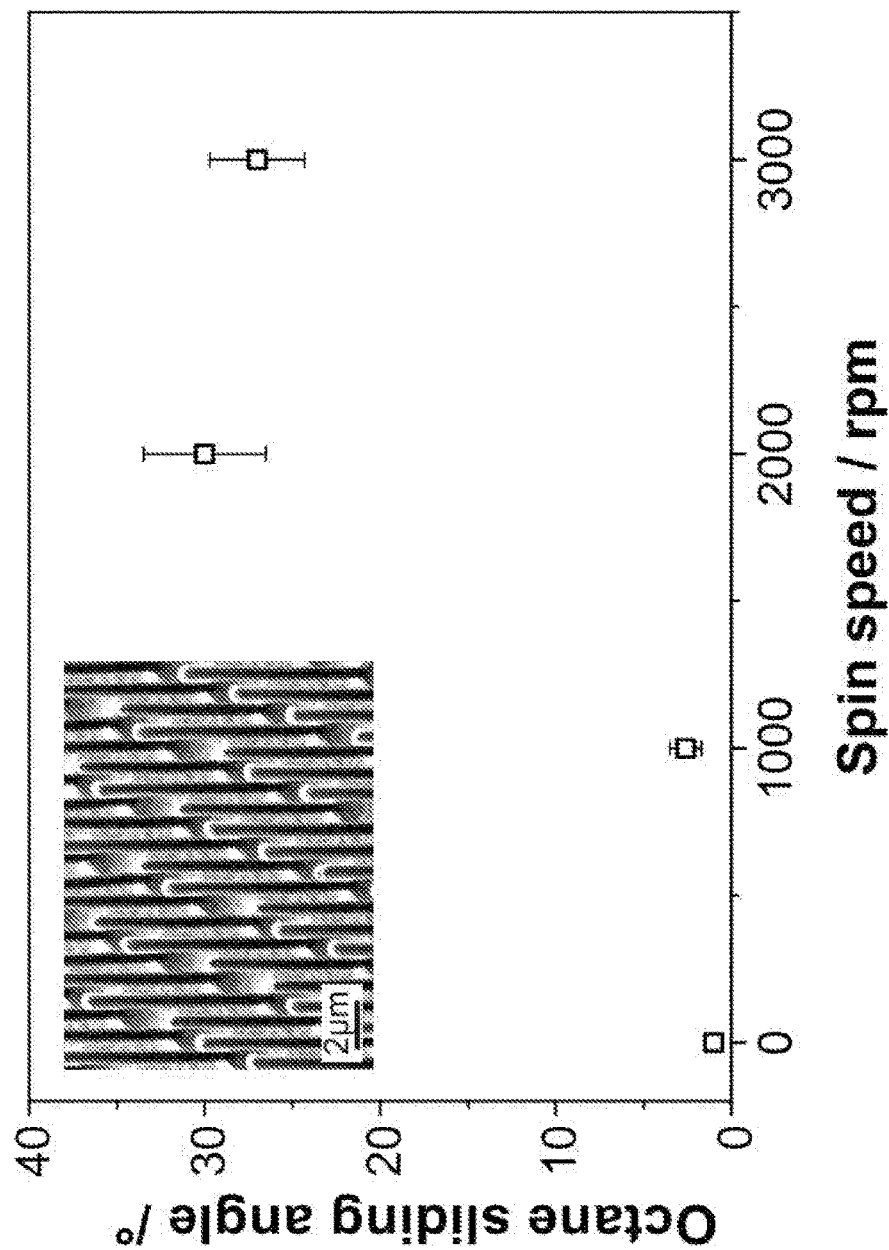
FIG. 17C show the octane sliding angle of octane for different shear forces using conventional epoxy posts without re-entrant curvature.

The substrates having a varying degree of roughness were subjected to high acceleration induced by a spin-coater at increasing rotational speeds to thin out the lubricating liquid film and mimic shear forces occurring in real life (e.g. strong wind). FIG. 17A shows the resulting octane sliding angles after various different spin-coating speeds. Remarkably, as shown, substrates with a roughness of that was greater than or equal to 1.61 did not lose their repellency and still showed low sliding angles of <5°, implying the presence of an intact lubricating liquid layer completely covering the porous solid, as schematically illustrated in insets 1 and 2 of FIG. 17B. All other samples having roughness below 1.61 showed increased sliding angles, indicating partial loss of the lubricating liquid layer at the damaged parts of the substrate and subsequent pinning of octane at the exposed solid surface, as schematically illustrated in insets 3 and 4 of FIG. 17B.

As discussed with reference to FIG. 7, closed cell structures perform better in retaining the lubricating liquid at high shear forces compared to open-cell epoxy micropillar structures.

Figures 18A, 18B, 18C, 18D, 18E, 18F, 18G, 18H, 18I:
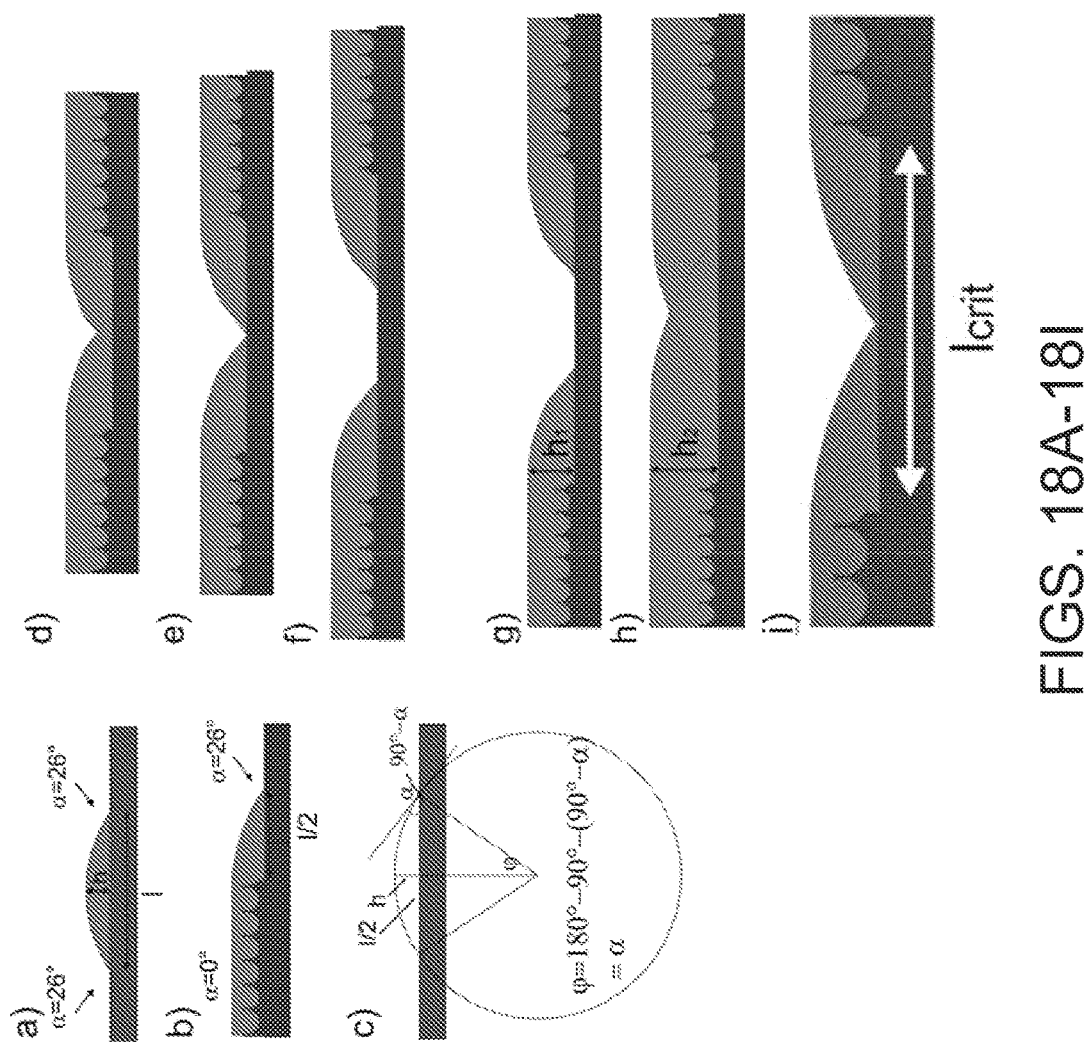
FIGS. 18A-18I show the theoretical critical length of defects that can support a SLIPS structure in accordance with certain embodiments.

To explain the persistence or failure of the differently damaged samples in their ability to repel octane and its dependence on the spinning speed, a geometrical model was used to describe the wetting situation in the inverse monolayer samples with defects. FIG. 18 schematically illustrates the model. On a flat surface (see FIG. 18A), the lubricating liquid will form a droplet that is characterized by its height h, lateral extension d and the contact angle with the substrate, a (in our case with DuPont Krytox 100 on a fluorinated Si wafer, α=26°). With one rough surface part present, the liquid will homogeneously spread on the rough part (i.e. apparent contact angle=0°) while the original contact angle prevails on the flat part (see FIG. 18B). The relevant distance to which the liquid will extend into the flat part is a function of the liquid height and the contact angle and is approximated as a half of the length of a drop on a flat substrate (l/2).

A substrate with a defect in between two rough features will consequently be wetted completely if the liquid parts extending from both roughness features can join in the flat, middle part. This happens if the relevant length (l; twice l/2 from liquid extending from two roughness features) is larger than the defect length (see FIG. 18D). If the defect length increases, it eventually reaches a critical length $l_{crit}$ at which it equals the distance the liquid film extends into the flat substrate part (see FIG. 18E). Any larger defect distance will thus lead to de-wetting of the lubricating liquid film (see FIG. 18F). As the distance l the liquid can extend into the flat part of the substrate is a function of the lubricating liquid layer thickness, the critical defect length $l_{crit}$ depends on the thickness of the lubricating liquid as well (see FIGS. 18G, 18H and 18I).

The critical length can be approximated by the lateral extension of a lubricating liquid droplet on a flat substrate. Thus, simple geometry can be used to calculate $l_{crit}$ as a function of the contact angle α and the lubricating liquid layer height h (All relevant parameters are shown in FIGS. 18C and 18I):

$$l_{crit} = \frac{2h}{\tan(\frac{\alpha}{2})}$$

Figure 19:
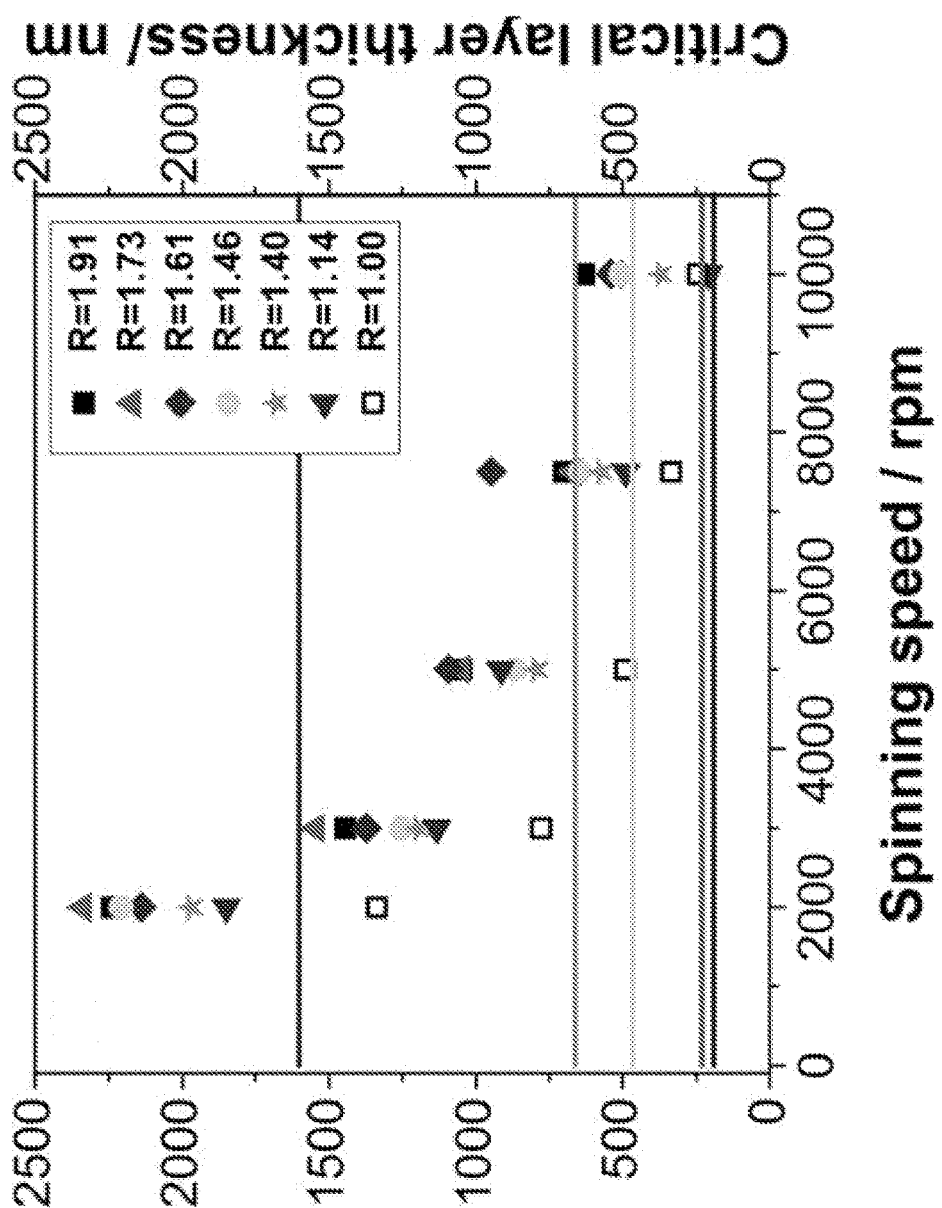
FIG. 19 shows a plot comparing the theoretical critical layer thickness with measurement layer thickness at different shear forces in accordance with certain embodiments.

FIG. 19 compares the experimentally measured lubricating liquid layer thicknesses after the individual spin-coating steps (data points) to the calculated critical lubricating liquid thicknesses (solid lines). Once the measured thickness drops below the theoretically calculated value, de-wetting and hence failure to repel the octane liquid is expected. A comparison between the predicted and measured repellency failures shown in Table 2 yielded an excellent agreement. Thus, our simple model accurately explains and predicts stable repellency or failure for any given sample at all different spinning speeds.

TABLE 2

Comparison of measured and predicted repellency failure (defined by an octane sliding angle <5°) for the different samples subjected to shear forces to thin out the lubricating liquid film.

| Damaged areas (%) | Sample roughness | Predicted failure spin speed (rpm) | Measured failure speed (rpm) |
|---|---|---|---|
| 0 | R = 1.91 | stable@10,000 | stable@10,000 |
| 19 | R = 1.73 | stable@10,000 | stable@10,000 |
| 33 | R = 1.61 | stable@10,000 | stable@10,000 |
| 49 | R = 1.46 | 10,000 | 10,000 |
| 56 | R = 1.40 | 7,500 | 5,000 |
| 85 | R = 1.14 | 2,000 | 2,000 |
| 100 | R = 1.00 | 0 | 0 |

The experiments reveal that the affinity of the lubricating liquid layer to the porous surface is high enough to provide a stable confinement to the structured solid even when exposed to strong shear forces arising from the acceleration of the sample upon spinning at high speeds. Samples with a substantial amount of damage (up to 33% of the complete surface) continuously support repellency even at the maximum rotational speeds available in the setup.

Applications

This SLIPS structure formed using a solid substrate having surface features with re-entrant curvature has important consequences for daily life applications.

All these characteristics described herein add to a versatile surface coating with an unprecedented combination of properties. A wide variety of applications of the presented technology can be envisioned, including omniphobic, self-cleaning and self-healing windows or solar panels, face shields, glasses, goggles or lenses and non-fouling windows or surface patterns in biomedical diagnostic assays or devices, car windows subjected to shear forces from driving, protective coatings for cameras and lenses that can be cleaned (and potentially re-lubricated directly during the cleaning procedure).

Some further exemplary applications of the SLIPS coatings include: transparent SLIPS lens protectors or lens coatings; anti-corrosive coating on metals, potentially with a adhesion promotion layer; anti-fouling coating for marine applications directly applied on aluminum alloy or stainless steel or other painted existing surfaces; anti-reflective, self-cleaning and transparent overcoats on solar panels and optics; anti-fogging coating inside and anti-fouling and self-healing coating outside on goggles, face shields or prescription glasses; anti-snow and anti-ice coating on windows or cables, airplanes or ceilings; anti-coagulant, non-sticky surfaces for biomedical devices; coatings on sports equipment where reduced friction and drag may be beneficial such as golf clubs, skis, skates, snow boards, water ski, wake board, surfing board, luge, bobsleigh, curling sheet, and other winter and water sports gear.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. Accordingly, those skilled in the art would recognize that the examples should not be limited as such. The present invention is directed to each individual feature, system, or method described herein. In addition, any combination of two or more such features, systems or methods, if such features, systems or methods are not mutually inconsistent, is included within the scope of the present invention.

What is claimed is:

1. A repellent surface comprising:
   a substrate having a plurality of surface features comprising pores containing re-entrant curvature, wherein the surface feature containing re-entrant curvature have an opening diameter that is smaller than the interior pore diameter measured at the center of the pore; and
   a lubricating liquid that has a chemical affinity to the substrate, as determined by an equilibrium contact angle of less than 90 degrees, to spontaneously infuse into, wet and stably adhere to said substrate having a plurality of surface features containing re-entrant curvature,
   the lubricating liquid wetting and adhering to the plurality of surface features containing re-entrant curvature to provide a stabilized liquid at a thickness sufficient to form a liquid overlayer above the plurality of surface features containing re-entrant curvature,
   wherein the plurality of surface features containing re-entrant curvature are effective to substantially stably immobilize the lubricating liquid between, on and over said substrate having a plurality of surface features containing re-entrant curvature, without dewetting from the substrate, to form a repellant surface.

2. The repellent surface of claim 1, wherein the surface features containing re-entrant curvature have a pore opening angle that is between 0 and 90°.

3. The repellent surface of claim 1, wherein the surface features containing re-entrant curvature have a pore opening angle that is between 45 and 80°.

4. The repellent surface of claim 1, wherein the surface features containing re-entrant curvature are interconnected.

5. The repellent surface of claim 4, wherein the surface features containing re-entrant curvature are mechanically robust to withstand damage from stresses encountered during use.

6. The repellent surface of claim 1, wherein the surface features containing re-entrant curvature comprise interconnected pores.

7. The repellent surface of claim 1, wherein the repellent surface is optically transparent.

8. The repellent surface of claim 1, wherein the surface features containing re-entrant curvature are bound to the substrate.

9. The repellent surface of claim 1, wherein surface features containing re-entrant curvature are obtained by an inverse structure of a monolayer of sacrificial colloidal particles.

10. The repellent surface of claim 9, wherein the colloidal particles are substantially the same size.

11. The repellent surface of claim 9, wherein the colloidal particles range in size from about 50 nm to more than tens of microns.

12. The repellent surface of claim 1, wherein the substrate includes one or more curvatures.

13. A method of making a repellent surface of claim 1, comprising:
    forming a substrate having a plurality of surface features containing re-entrant curvature, wherein the surface feature containing re-entrant curvature have an opening diameter that is smaller than the interior pore diameter measured at the center of the pore; and
    providing a lubricating liquid layer stably immobilized over said substrate having a plurality of surface features containing reentrant curvature.

14. The method of claim 13, wherein the surface features containing re-entrant curvature have a pore opening angle that is between 0 and 90°.

15. The method of claim 13, wherein the surface features containing re-entrant curvature have a pore opening angle that is between 45 and 80°.

16. The method of claim 13, wherein the surface features containing re-entrant curvature are interconnected.

17. The method of claim 16, wherein the surface features containing re-entrant curvature are mechanically robust.

18. The method of claim 13, wherein the surface features containing re-entrant curvature contain interconnected pores.

19. The method of claim 13, wherein the repellent surface is optically transparent.

20. The method of claim 13, wherein the surface features containing re-entrant curvature are bound to the substrate.

21. The method of claim 13, wherein said forming a substrate having a plurality of surface features containing re-entrant curvature comprises:
    forming a monolayer of colloidal particles over the substrate;
    filling the interstitial spaces between the colloidal particles of the monolayer to have a pore opening angle that is between 0 and 90°; and
    removing the monolayer of colloidal particles to obtain surface features containing re-entrant curvature.

22. The method of claim 21, wherein the colloidal particles are substantially the same size.

23. The method of claim 21, wherein the colloidal particles range in size from about 50 nm to about tens of microns.

24. The method of claim 21, further comprising:
    patterning regions of said surface features containing re-entrant curvature with chemical groups that repel said lubricating liquid.

25. The method of claim 21, further comprising:
    patterning regions of said surface features containing re-entrant curvature with chemical groups that attract said lubricating liquid.

26. The repellent surface of claim 1, wherein the plurality of surface features containing re-entrant curvature are effective to substantially stably immobilize the lubricating liquid between, on and over said substrate having a plurality of surface features containing re-entrant curvature, without dewetting from the substrate under atmospheric pressure, to form a repellant surface.

* * * * *